(12) United States Patent
Gupta et al.

(10) Patent No.: US 9,534,114 B2
(45) Date of Patent: Jan. 3, 2017

(54) MODIFIED AMINO RESINS

(71) Applicant: ALLNEX IP S.A.R.L., Luxembourg (LU)

(72) Inventors: Ram B. Gupta, Stamford, CT (US); Urvee Y. Treasurer, Stamford, CT (US); Lawrence A. Flood, Norwalk, CT (US); Barry A. Lawless, Milford, CT (US)

(73) Assignee: ALLNEX IP S.A.R.L., Luxembourg (LU)

( * ) Notice: Subject to any disclaimer, the term of this patent is extended or adjusted under 35 U.S.C. 154(b) by 0 days.

(21) Appl. No.: 14/382,628

(22) PCT Filed: Mar. 22, 2013

(86) PCT No.: PCT/US2013/033493
§ 371 (c)(1),
(2) Date: Sep. 3, 2014

(87) PCT Pub. No.: WO2013/142787
PCT Pub. Date: Sep. 26, 2013

(65) Prior Publication Data
US 2015/0080523 A1 Mar. 19, 2015

Related U.S. Application Data

(60) Provisional application No. 61/614,879, filed on Mar. 23, 2012.

(51) Int. Cl.
| | | |
|---|---|---|
| *C08G 12/12* | (2006.01) | |
| *C08L 61/32* | (2006.01) | |
| *C08L 61/26* | (2006.01) | |
| *C08G 12/04* | (2006.01) | |
| *C08L 61/30* | (2006.01) | |
| *C08G 12/28* | (2006.01) | |
| *C09D 7/12* | (2006.01) | |
| *C08G 12/00* | (2006.01) | |
| *C08K 5/00* | (2006.01) | |

(52) U.S. Cl.
CPC ............ *C08L 61/32* (2013.01); *C08G 12/043* (2013.01); *C08G 12/046* (2013.01); *C08G 12/28* (2013.01); *C08L 61/26* (2013.01); *C08L 61/30* (2013.01); *C09D 7/125* (2013.01); *C08L 2205/025* (2013.01)

(58) Field of Classification Search
CPC ....................................... C08G 12/12
USPC .................. 528/259, 245; 525/540; 524/539
See application file for complete search history.

(56) References Cited

U.S. PATENT DOCUMENTS

| | | |
|---|---|---|
| 4,421,880 A | 12/1983 | Hunsucker et al. |
| 2002/0101007 A1 | 8/2002 | Koide et al. |
| 2006/0033993 A1 | 2/2006 | Sugino et al. |
| 2009/0281218 A1 | 11/2009 | Hardt et al. |
| 2010/0099793 A1 | 4/2010 | Wunder |
| 2010/0297356 A1 | 11/2010 | Flood et al. |

FOREIGN PATENT DOCUMENTS

| | | |
|---|---|---|
| DE | 10 2005 057 645 | 6/2007 |
| DE | 10 2006 061 890 | 7/2008 |
| EP | 1 209 186 | 5/2002 |
| GB | 2 058 099 | 4/1981 |
| WO | 2009/073836 | 6/2009 |

OTHER PUBLICATIONS

International Search Report issued Jun. 10, 2013 in International (PCT) Application No. PCT/US2013/033493.

*Primary Examiner* — Duc Truong
(74) *Attorney, Agent, or Firm* — Wenderoth, Lind & Ponack, L.L.P.

(57) ABSTRACT

This invention relates to products H made by reaction of a cyclic alkyleneurea U, at least one multifunctional aldehyde A2, and at least one of (a) an aminoplast former M that is not the same as the cyclic alkyleneurea U, and (b) a monofunctional aldehyde A1, which product H is optionally etherified by reaction of at least a part of the hydroxyl groups formed by addition reaction of N—H groups and aldehyde groups, with an alcohol having from one to ten carbon atoms, and wherein glyoxal is present in the at least one multifunctional aldehyde A2, to processes for their preparation, and to a method of use thereof in coating compositions.

31 Claims, No Drawings

MODIFIED AMINO RESINS

FIELD OF THE INVENTION

This invention relates to modified amino resins, their use as crosslinking agents and to curable compositions containing polyfunctional oligomeric or polymeric materials and the said modified amino resins.

BACKGROUND OF THE INVENTION

Crosslinking agents based on amino resins and coating compositions made with these are well known in the art and have been used for more than half a century in diverse applications including general industrial coatings, automotive coatings, coil coatings, powder coatings, baking enamels, and wood finishes. These crosslinking agents are based on reaction products of aldehydes, usually formaldehyde, with amine, amide, urethane or amidine compounds (together referred to as aminoplast formers) such as melamine, guanamines, urea, and substituted ureas. Among the major drawbacks of coatings based on these amino resins are formaldehyde emissions during cure.

Various crosslinking compositions have been developed that are based on combinations of aminoplast formers and aldehydes other than formaldehyde. Many of these are either less efficient or more expensive than the known formaldehyde-based systems, or are otherwise objectionable from a safety and health view. Despite numerous efforts made, none of the crosslinker resins proposed has yet found wide market acceptance. A reaction product of a cyclic alkyleneurea and glyoxal when combined with polyfunctional hydroxy and/or carboxyl group containing materials offers good crosslinking already at low (ambient=23° C.) temperature, see WO 2009/073836 A1.

It is an object of this invention to provide crosslinking compositions based on reaction products of cyclic alkyleneureas and multifunctional aldehydes that have application properties that can be tailored to the intended use, and that are either on par with the known formaldehyde based systems, or at least provide a favourable match to these known systems.

SUMMARY OF THE INVENTION

It has been found that a product H can be used as crosslinking agent that provides good curing activity and no formaldehyde emissions which product H comprises a mixture of reaction products P of cyclic alkyleneureas U and multifunctional aldehydes A2 with further reaction products having as constituents, besides U and A2, also at least one of aminoplast formers M which are different from the cyclic alkyleneureas U, and of monofunctional aldehydes A1. The mixture which constitutes product H therefore comprises the reaction products P made by reacting cyclic alkylene ureas U and multifunctional aldehydes A2, and at least one of the following reaction products:

a) reaction products UMA2 made by reaction of cyclic alkylene ureas U, aminoplast formers M which are different from the cyclic alkyleneureas U, and multifunctional aldehydes A2 b) reaction products UMA1A2 made by reaction of cyclic alkylene ureas U, aminoplast formers M which are different from the cyclic alkyleneureas U, monofunctional aldehydes A1, and multifunctional aldehydes A2 c) reaction products MA1A2 made by reaction of aminoplast formers M which are different from the cyclic alkyleneureas U, monofunctional aldehydes A1, and multifunctional aldehydes A2 d) reaction products UA1A2 made by reaction of cyclic alkylene ureas U, monofunctional aldehydes A1, and multifunctional aldehydes A2 e) reaction products MA2 made by reaction of aminoplast formers M which are different from the cyclic alkyleneureas U, and multifunctional aldehydes A2 f) reaction products UA1 made by reaction of cyclic alkylene ureas U, and monofunctional aldehydes A1 g) reaction products UMA1 made by reaction of cyclic alkylene ureas U, aminoplast formers M which are different from the cyclic alkyleneureas U, and monofunctional aldehydes A1 h) reaction products MA1 made by reaction of aminoplast formers M which are different from the cyclic alkyleneureas U, and monofunctional aldehydes A1 wherein, in the case of reaction product h) being present in mixture with the reaction product P which is UA2, at least one of the other reaction products a), b), c), d), e), f), or g) is also present in the mixture.

It is understood that also mixtures of the different reactants can be used in the reactions, such as mixtures of cyclic alkyleneureas U, mixtures of multifunctional aldehydes A2, mixtures of aminoplast formers M which are different from the cyclic alkyleneureas U, and mixtures of monofunctional aldehydes A1.

In case of reaction product f) being present in mixture with the reaction product P which is UA2, at least one of the other reaction products a), b), c), d, or e) is also present in the mixture.

The product H can be made by concurrent or sequential reaction of the starting products U, M, A1, and A2. "Concurrent reaction" means, as is usual in the field, to charge all reactants together or within a short time span before a significant extent of reaction can occur, before starting the reaction by heating to the reaction temperature, or adding the catalyst if needed. A sequential reaction preferably starts with charging U and A2, and reacting these at least partially, and then adding either both M and A1, or only M, or only A1, or adding M before A1, or adding A1 before M, and then conducting the reaction until at least 50%, preferably at least 90%, of the mass of the reactants is used in the reaction.

As used in this patent application, a "reaction product" of two or more different molecules selected from the group consisting of A1, A2, M, and U has moieties of the named constituents within one molecule. As used herein, "at least partially reacting" means conducting a reaction in a way that at least 1% of the mass of a reactant is used in the reaction under consideration to form a chemical bond with another reactant. Preferably, this extent of reaction is at least 5%, particularly preferred, at least 10%.

Other than using mixtures of pre-formed crosslinkers, such as a mere mixture of a reaction product UA2 of a cyclic urea U and a multifunctional aldehyde A2, with a reaction product MA1 of an aminoplast former M which is not a cyclic urea, and a monofunctional aldehyde A1, it has turned out to be advantageous by sequential or concurrent reaction to provide a range of products H that can be used as crosslinking agents tailored to specific applications, and meet the required specifications.

Products of such sequential or concurrent reaction comprising mixtures of a reaction product P of a cyclic alkyleneurea U and a multifunctional aldehyde A2 with at least one of aminoplast formers M that are not the same as the cyclic alkyleneureas U, and monofunctional aldehydes A1, can be specifically adapted to desired curing speed, and temperature range.

The invention therefore relates to a crosslinker composition comprising a reaction product of at least one cyclic alkyleneurea U, at least one multifunctional aldehyde A2, and at least one of
(a) at least one aminoplast former M that is not the same as the cyclic alkyleneurea U, and of
(b) at least one monofunctional aldehyde A1,
wherein the reaction product is optionally etherified by reaction of at least a part of the hydroxyl groups formed by addition reaction of N—H groups and aldehyde groups, with one or more aliphatic alcohols R'—OH having preferably from one to ten carbon atoms, and which alcohol R'—OH may be linear, branched or cyclic, and wherein glyoxal is present in the at least one multifunctional aldehyde A2.

The invention relates also to coating compositions comprising a reaction product of at least one cyclic alkyleneurea U, at least one multifunctional aldehyde A2, and at least one of (a) at least one aminoplast former M that is not the same as the cyclic alkyleneurea U, and of (b) at least one monofunctional aldehyde A1, which reaction product is optionally etherified by reaction of at least a part of the hydroxyl groups formed by addition reaction of N—H groups and aldehyde groups, with one or more aliphatic alcohols R'—OH having preferably from one to ten carbon atoms, and which alcohol R'—OH may be linear, branched or cyclic, and wherein glyoxal is present in the at least one multifunctional aldehyde A2, and a crosslinkable resin which may be waterborne or solvent-borne, and is an oligomeric or polymeric material having at least one kind of functional groups selected from the group consisting of hydroxy functional groups, acid functional groups, amide functional groups, amino functional groups, imino functional groups, mercaptan functional groups, phosphine functional groups, and carbamate functional groups, which functional groups are reactive with the optionally etherified reaction products.

This invention further relates to coatings produced from such coating compositions, which can be deposited on substrates which may be metal, semiconductor surfaces, plastics including composite, thermoplastic and thermoset materials, glass, ceramic, stone, concrete, plaster, wood, fabricated wood, paper, cardboard, leather, and textiles.

DETAILED DESCRIPTION OF PREFERRED EMBODIMENTS

When using, according to the invention, such products H, the ratio of the sum of the mass m(U) of the cyclic alkylene ureas U and the mass m(A2) of multifunctional aldehyde A2, to the mass m(H) of the product H, [m(U)+m(A2)]/m(H), is from 1/99 to 99/1, preferably from 10/90 to 90/10, and particularly preferred, from 30/70 to 70/30. The masses in as used herein always stand for the mass of the active ingredient, and not the mass of a solution containing the active ingredient, if not expressly indicated otherwise.

The multifunctional aldehyde A2 has the formula OHC—R''—CHO where R'' may be a direct bond or a divalent radical which may preferably be a linear, branched or cyclic aliphatic divalent radical and may have from one to forty carbon atoms, both these options for R' leading to a divalent aldehyde having exactly two —CHO groups, or an aliphatic divalent radical which may be linear, branched or cyclic and may have from one to thirty-eight carbon atoms, which radical carries at least one additional aldehyde group —CHO, which latter option leads to trivalent or polyvalent aliphatic aldehydes having at least three aldehyde groups.

For the purpose of this invention, the multifunctional aldehyde A2 is glyoxal or a mixture of glyoxal with at least one further multifunctional aldehyde A2. Preferably, also these further multifunctional aldehydes A2 are difunctional, i.e. they are dialdehydes.

"Multifunctional" is used to denote, in the context of this invention, a molecule having more than one functional group of the same kind. Preferred multifunctional aldehydes A2 are divalent aliphatic aldehydes, particularly glyoxal, malonic dialdehyde, succinic dialdehyde, glutaric dialdehyde, and adipaldehyde. Especially preferred is glyoxal. It is also possible to use mixtures of these, preferably mixtures comprising a mass fraction of at least 30% of glyoxal, particularly preferred, at least 50% of glyoxal. Glyoxal may be used for this invention in aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions.

The cyclic alkyleneureas U which may be used according to the present invention have at least one unsubstituted amidic >NH group. These cyclic alkyleneureas U are cycloaliphatic or bi-cycloaliphatic compounds having an element of the structure —NH—CO—NH— within an aliphatic ring structure, the total number of ring atoms preferably being from 5 to 7 (ethylene urea or imidazolidin-2-one, 1,2-propylene urea or 4-methylimidazolidin-2-one, 1,3-propylene urea or 2-ketohexahydropyrimidine or tetrahydro-(1H)-pyridiminone, 1,4-butylene urea or tetramethylene urea). The alkylene group may be substituted on one or more carbon atoms by hydroxyl groups, or by alkyl groups, or alkoxy groups, each having preferably from one to ten carbon atoms. It is, however, preferred that the alkylene group of the cyclic alkyleneureas U is unsubstituted. Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea.

The cyclic alkyleneureas U may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the cyclic alkyleneurea U is selected from the group consisting of ethylene urea, 1,3-propylene urea, and glycoluril, and from the group consisting of those cyclic ureas which additionally have at least one substituent $R^{3i}$ on at least one of the nitrogen or carbon atoms of the said cyclic ureas, or their mixtures, with the proviso that at least one nitrogen atom is unsubstituted, and each substituent $R^{3i}$ is selected independently from the group consisting of linear, branched and cyclic alkyl groups having from one to ten carbon atoms, and also from olefinically unsaturated linear or branched aliphatic groups having from two to ten carbon atoms, and from hydroxyalkyl and aminoalkyl groups having from one to ten carbon atoms, where oxygen atoms or —NH— groups may be inserted between any two methylene —$CH_2$— or alkylidene >$CHR^4$ groups, where $R^4$ is a further linear or branched aliphatic group having from one to ten carbon atoms.

The cyclic alkyleneureas may also be generated in situ, by reaction of a compound which has two or more >NH groups with an at least difunctional aldehyde, such as by reacting a diamine or a diamide with a dialdehyde. An example is dihydroxyethyleneurea which is formed by reacting urea $H_2N—CO—NH_2$ with glyoxal OHC—CHO.

It has been found that when using purified cyclic alkyleneureas U instead of commercially available qualities, e.g. commercial ethylene urea which has about 96% purity (the mass fraction of ethylene urea in one commercially available product is (96.0±0.5) %), both colour and stability of the reaction product with multifunctional aldehydes A2 are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality.

A particularly preferred combination is based on glyoxal reacted with ethylene urea and at least one of aminoplast formers M, and optionally, either glyoxal, or ethylene urea, or both, in mixture with other multifunctional aldehydes A2 and/or other cyclic alkyleneureas U. In such combinations, the ratio of the mass of ethylene urea to the mass of all aminoplast formers M used for the synthesis of the reaction product is from 1:99 to 99:1, preferably, from 30:70 to 95:5, and particularly preferred, from 40:60 to 90:10.

The aminoplast formers M can be selected from the group consisting of cyclic ureas U2 having at least two carbonyl groups in the ring, such as hydantoin, parabanic acid, barbituric acid, and alloxan, as well as thioderivatives of these, from amines which are preferably aromatic, such as aniline and p-aminobenzyl alcohol, from linear, branched or cyclic amides of mono- or multifunctional carboxylic acids, such as stearylamide, adipic diamide, and lactams such as gamma-butyrolactam, delta-valerolactam, and epsilon-caprolactam, including also the amides of aromatic carboxylic acids, such as isophthalic diamide, sulphonamides such as p-toluene sulphonamide, sulphurylamides, cyanamide and its derivatives, dicyandiamide and its derivatives, guanidine and its derivatives, and particularly, urea, thiourea, biuret, 2-imino-4-thiobiuret, and homologues of these such as N,N-dimethyl urea and N,N'-dimethyl urea, as well as the corresponding ethyl and higher alkyl derivatives, and the thiourea derivatives of these, carbamates or urethanes R"—O—CO—$NH_2$ and thiourethanes R"—O—CS—$NH_2$, R"—S—CO—$NH_2$ or R"—S—CS—$NH_2$ where R" may be an aliphatic, cycloaliphatic, aromatic or heterocyclic radical having from one to twenty carbon atoms, not more than one of the amidic hydrogen atoms optionally being substituted by a linear, branched or cyclic alkyl or alkenyl group having from one to ten carbon atoms, melamine and its homologues N-alkylmelamine, N,N-dialkylmelamine, and N,N',N"-trialkyl melamine having preferably from one to eight carbon atoms in the alkyl group which may be the same in each case, or which may also be different, preferably N-methylmelamine, N,N-dimethylmelamine, sym-trimethyl melamine, and the corresponding ethyl compounds, guanamines such as formoguanamine, acetoguanamine, and benzoguanamine, from mixed urea-carbamates having a structure $H_2N—CO—NH-Q-O—CO—NH_2$, and also from cyclic urea compounds that are different from the cyclic alkyleneureas U, such as hydantoin also known as glycolyl urea, and parabanic acid also known as oxalyl urea, as well as homologues and substitution products of these.

Preferred are products H where the at least one aminoplast former M is selected from the group consisting of amines, acid amides, urethanes Ru—O—CO—$NH_2$ and thiourethanes Ru—O—CS—$NH_2$, Ru—S—CO—$NH_2$ or Ru—S—CS—$NH_2$ where Ru may be a linear or branched aliphatic, cycloaliphatic, aromatic or heterocyclic radical having up to twenty carbon atoms, cyclic amidines selected from the group consisting of melamine and its homologues, guanamines, and also from cyclic urea compounds that are not cyclic alkylene ureas, preferably hydantoin or parabanic acid as mentioned supra. Preferred urethanes are linear or branched alkylurethanes, such as ethyl urethane and butyl urethane, and alkylene bisurethanes such as ethylene and butylene bisurethane.

Further preferred are products H wherein the amides are selected from the group consisting of
 linear, branched or cyclic amides of mono- or multifunctional carboxylic acids, including also the amides of aromatic carboxylic acids,
 lactams having from four to fifteen carbon atoms, preferably selected from the group consisting of gamma-butyrolactam, delta-valerolactam, epsilon-caprolactam, and omega-laurinlactam,
 sulphonamides, sulphurylamides,
 cyanamide and its derivatives,
 urea, thiourea, guanidine, biuret, 2-imino-4-thiobiuret, and derivatives and homologues of these.

Also preferred are reaction products P wherein the amidines are selected from the group consisting of melamine, benzoguanamine, acetoguanamine, formoguanamine, N-alkyl-melamine, N,N'-dialkylmelamine, N,N',N"-trialkylmelamine, trialkoxymelamine, as well as alkoxycarbamoyl-triazines in which at least one of the aminic hydrogen atoms of melamine is replaced by an alkoxycarbonyl group, wherein each of the alkyl and alkoxy groups mentioned may have, independent from others in the same molecule, from one to ten carbon atoms in the alkoxy group.

Also preferred are reaction products P wherein the multifunctional aldehydes A2 are linear or branched or cyclic aliphatic aldehydes having more than one aldehyde group per molecule, and from two to forty carbon atoms preferably selected from the group consisting of glyoxal, malonaldehyde, succinaldehyde, glutaraldehyde, adipaldehyde, 2-methoxymethyl-2-4.-dimethylpentan-1,5-dial,cyclohexane-1,3-dial, cyclohexane-1,4-dial, and dialdehydes derived from dimer fatty acids.

Further preferred are reaction products P wherein the monofunctional aldehydes are linear branched or cyclic aliphatic aldehydes having from one to twenty carbon atoms, preferably selected from the group consisting of formaldehyde, acetaldehyde, propionaldehyde, n-butyraldehyde, 2-methylpropionaldehyde, valeraldehyde (1-pentanal), capronaldehyde (1-hexanal), enanthal (1-heptanal), caprylaldehyde (1-octanal), and 2-ethyl-1-hexanal.

It has further been found, in the experiments underlying the present invention, that by reaction of a multifunctional aldehyde A2 with melamine derivatives that have at least one alkoxycarbonyl group attached to one or more of the nitrogen atoms that do not form a part of the ring, reaction products are formed where either an amino group of the melamine derivative, or a carbamoyl group, or both react under addition with an aldehyde group of the substituted melamine, and formation of a structure —C(OH)—N(X)— where X can be hydrogen or an alkoxycarbonyl group. In the case of two molecules of a bis-(alkoxycarbamoyl)-monoaminotriazine reacting with one molecule of a difunctional aldehyde, a molecule is formed which has four alkoxycarbamoyl groups, under preferred reaction of the aldehyde with the unsubstituted amino groups, which molecule can be used as crosslinker for polymers having hydroxy, amino, mercapto, phosphine, or carboxyl functionality. In the case of a mono-(alkoxy-carbamoyl) diamino-triazine reacting with a difunctional aldehyde, a linear oligomer or polymer is formed that has chain-pendant alkoxycarbamoyl groups.

Depending on the stoichiometry and functionality, a broad spectrum of multifunctional crosslinkers with high crosslinking efficiency can thus be formed.

The reaction between the cyclic alkyleneurea U, the amine, amide, or amidine compounds M, and the multifunctional aldehyde A2, be it sequential or concurrent, can preferably be conducted in the presence of a solvent which does not react with either of the cyclic alkyleneurea U, the amine, amide, or amidine compounds M, and the multifunctional aldehyde A2, and the reaction product P of these, as well as intermediate reaction products. The solvent may be added to the reaction mixture for the first step, or to the reaction mixture after the first step, in a multistep process. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

In a preferred variant, the mixture of cyclic alkyleneurea U, aminoplast former compounds M, and multifunctional aldehyde A2, and optionally, water or solvent, is concentrated before or during the reaction by removing volatile constituents by distillation, or distillation under reduced pressure.

In a sequential reaction, an addition reaction is conducted in the first step between a cyclic alkyleneurea U and a multifunctional aldehyde A2, preferably in a stoichiometric ratio such that the ratio of the amount of substance n(—CHO) of aldehyde —CHO groups in the multifunctional aldehyde A2 to the amount of substance n(>NH) of amidic >NH groups in U is from 1.01 mol/mol to 2 mol/mol. In the second step, the aldehyde-functional intermediate of the first step is reacted with the aminoplast former compound M under consumption of at least a part of the aldehyde groups of the intermediate product formed in the first step, or by reaction of compound M with unreacted multifunctional aldehyde A2. This latter alternative is preferred when an in-situ-formation of an aminoplast former is desired, such as in the case of the formation of 1,2-dihydroxyethylene urea (4,5-dihydroxy-imidazolidin-2-one) from urea and glyoxal. The aminoplast former made by the in-situ-reaction can in turn react with further mulifunctional aldehyde A2 or with the aldehyde-functional intermediate of the first step. If this two-step or sequential reaction is chosen, proper control of the pH during the reaction to keep it in the interval of from 5 to 8 can suppress equilibration by backwards reaction. End-capped products can thus be formed if a monofunctional aminoplast former is chosen for this last step, such as N-methyl-ethylene urea.

In a concurrent reaction, random polyadducts are formed under kinetic control if the reactivities of the different aminoplast formers are similar, and under thermodynamic control if the pH and other reaction conditions are chosen such that equilibrium reaction conditions are favoured, preferably at a range of pH lower than 5, or higher than 8, at higher temperature, and for extended periods of time.

Preferred ways of making the products H are the following:

the first variant comprises
a) charging at least one cyclic alkyleneurea U, optionally in mixture with at least one aminoplast former M that is not the same as the cyclic alkyleneurea U, b) admixing at least one multifunctional aldehyde A2, optionally in mixture with at least one monofunctional aldehyde A1, to the mixture of step a) to effect an addition reaction to form a reaction product, optionally, in the presence of a solvent which does not react with any of the at least one multifunctional aldehyde A2, the at least one monofunctional aldehyde A1, the at least one cyclic alkyleneurea U, the at least one aminoplast former M, and the reaction product of these, c) optionally, removing water, during or after step b)

d) optionally, adding an alcohol $R^1$—OH, and etherifying under acid conditions, and optionally, removing at least one of water and unreacted alcohol $R^1$—OH, e) further optionally, adding after step d) a further quantity of an alcohol $R^2$—OH and etherifying under acid conditions, and optionally, removing at least one of water and unreacted alcohol $R^2$—OH, wherein, if step e) is done, it may be done once or more than once, and where $R^1$ is selected from the group consisting of linear, branched and cyclic alkyl groups preferably having from one to ten carbon atoms, and optionally at least one olefinic unsaturation, and $R^2$ is selected from the group consisting of linear, branched and cyclic alkyl groups preferably having from one to ten carbon atoms, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one;

the second variant comprises
a) admixing at least one multifunctional aldehyde A2, optionally in mixture with at least one monofunctional aldehyde A1, to at least one cyclic alkyleneurea U to effect an addition reaction to form a reaction product UA, wherein the quantities of A2, and U and if present, A1, are chosen such that there is an excess of the amount of substance of aldehyde groups over the amount of substance of NH groups in the at least one cyclic alkylene urea U, and optionally, removing water, b) admixing at least one aminoplast former M that is not the same as the cyclic alkyleneurea U and continuing the addition reaction to form a reaction product, c) optionally, removing water, during or after step a) and/or during or after step b), where steps a) and b) are optionally conducted in the presence of a solvent which does not react with any of the multifunctional aldehyde A2, the monofunctional aldehyde A1, the cyclic alkyleneurea U, the at least one aminoplast former M, the reaction product UA, and the reaction product of these, d) optionally, adding an alcohol $R^1$—OH, and etherifying under acid conditions, and optionally, removing at least one of water and unreacted alcohol $R^1$—OH, e) further optionally, adding after step d) a further quantity of an alcohol $R^2$—OH and etherifying under acid conditions, optionally, removing at least one of water and unreacted alcohol $R^2$—OH, wherein, if step e) is done, it may be done once or more than once, and where $R^1$ is selected from the group consisting of linear, branched and cyclic alkyl groups preferably having from one to ten carbon atoms, and optionally at least one olefinic unsaturation, and $R^2$ is selected from the group consisting of linear, branched and cyclic alkyl groups preferably having from one to ten carbon atoms, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one; the abbreviation UA representing an adduct of a cyclic alkylene urea U with a multifunctional aldehyde A2 or a monofunctional aldehyde A1 or with both A2 and A1, the third variant comprises a) admixing at least one multifunctional aldehyde A2, optionally in mixture with at least one monofunctional aldehyde A1, to at least one aminoplast former M that is not the same as the at least one cyclic alkyleneurea U of step b) to effect an addition reaction under formation of the reaction product MA, wherein the quantities of the at least one multifunctional aldehyde A2 and M, and optionally, the at least one monofunctional aldehyde A1, are chosen such that there is an excess of the amount of substance of aldehyde groups over the amount of substance of NH groups in the at least one aminoplast former M, and optionally, removing water during or after this step a), b) admixing at least one cyclic alkyleneurea U and continuing the addition reaction to form a reaction product, c) optionally, removing water, during or after step b)

where steps a) and b) are optionally conducted in the presence of a solvent which does not react with any of the multifunctional aldehyde A2, the monofunctional aldehyde A1, the cyclic alkyleneurea U, the at least one aminoplast former M, the reaction product MA, and the reaction product of these, the abbreviation MA representing an adduct of an aminoplast former M which is different from the cyclic alkylene urea U, with a multifunctional aldehyde A2 or a monofunctional aldehyde A1 or with both A2 and A1, d) optionally, adding an alcohol R'—OH, and etherifying under acid conditions, and optionally, removing at least one of water and unreacted alcohol $R^1$—OH, e) further optionally, adding after step d) a further quantity of an alcohol $R^2$—OH and etherifying under acid conditions, and optionally, removing at least one of water and unreacted alcohol $R^2$—OH, wherein, if step e) is done, it may be done once or more than once, and where $R^1$ is selected from the group consisting of linear, branched and cyclic alkyl groups preferably having from one to ten carbon atoms, and optionally at least one olefinic unsaturation, and $R^2$ is selected from the group consisting of linear, branched and cyclic alkyl groups preferably having from one to ten carbon atoms, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one;

and the fourth variant comprises a) charging at least one cyclic alkyleneurea U, b) admixing at least one multifunctional aldehyde A2, optionally in mixture with at least one monofunctional aldehyde A1, to effect an addition reaction to form a reaction product UA, c) optionally, removing water, during or after step b), to form an at least partially dehydrated reaction product UA, d) adding to the reaction product UA of steps b) or c) a preformed addition product MA of an aminoplast former M and a monofunctional aldehyde A1, or of a preformed addition product MA of an aminoplast former M and a mixture of a monofunctional aldehyde A1 and a multifunctional aldehyde A2, or a mixture of an aminoplast former M and at least one of a monofunctional aldehyde A1, and/or at least one multifunctional aldehyde A2, and reacting the mixture thus formed to effect formation of a reaction product under at least a partial interchange of the components of the addition products UA, optionally under removal of water, e) optionally, adding an alcohol $R^1$—OH, and etherifying under acid conditions, and optionally, removing at least one of water and unreacted alcohol $R^1$—OH, f) further optionally, adding after step e) a further quantity of an alcohol $R^2$—OH and etherifying under acid conditions, optionally, removing at least one of water and unreacted alcohol $R^2$—OH, wherein, if step f) is done, it may be done once or more than once, wherein optionally, any of the steps b) to f) may be conducted in the presence of a solvent which does not react with any of the multifunctional aldehyde A2, the at least one monofunctional aldehyde A1, the at least one cyclic alkyleneurea U, the at least one aminoplast former M, the addition product MA of an aminoplast former M and a mixture of a monofunctional aldehyde A1 and a multifunctional aldehyde A2, and the reaction products formed from these, and where $R^1$ is selected from the group consisting of linear, branched and cyclic alkyl groups preferably having from one to ten carbon atoms, and optionally at least one olefinic unsaturation, and $R^2$ is selected from the group consisting of linear, branched and cyclic alkyl groups preferably having from one to ten carbon atoms, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one;

and the fifth variant comprises a) charging at least one aminoplast former M, b) admixing at least one monofunctional aldehyde A1, optionally in mixture with at least one multifunctional aldehyde A2, to effect an addition reaction to form a reaction product MA, optionally, in the presence of a solvent which does not react with any of the at least one multifunctional aldehyde A2, the at least one monofunctional aldehyde A1, the at least one aminoplast former M, and the reaction product MA, c) optionally, removing water, during or after step b), to form an at least partially dehydrated reaction product MA, d) adding to the reaction product MA of steps b) or c) a preformed addition product UA of a cyclic alkylene urea U and a multifunctional aldehyde A2, or a preformed addition product UA of at least one cyclic alkylene urea U and a mixture of a monofunctional aldehyde A1 and a multifunctional aldehyde A2, or a mixture of a cyclic alkylene urea U and at least one of a monofunctional aldehyde A1, and/or a multifunctional aldehyde A2, and reacting the mixture thus formed to effect formation of a reaction product under at least a partial interchange of the components of the addition products MA and UA, optionally under removal of water, and further optionally, in the presence of a solvent which does not react with any of the at least one multifunctional aldehyde A2, the at least one monofunctional aldehyde A1, the at least one cyclic alkyleneurea U, the at least one aminoplast former M, and the reaction products formed from these, e) optionally, adding an alcohol $R^1$—OH, and etherifying under acid conditions, and optionally, removing at least one of water and unreacted alcohol $R^1$—OH, f) further optionally, adding after step e) a further quantity of an alcohol R²—OH and etherifying under acid conditions, optionally, removing at least one of water and unreacted alcohol R²—OH, wherein, if step f) is done, it may be done once or more than once, and where R¹ is selected from the group consisting of linear, branched and cyclic alkyl groups preferably having from one to ten carbon atoms, and optionally at least one olefinic unsaturation, and R² is selected from the group consisting of linear, branched and cyclic alkyl groups preferably having from one to ten carbon atoms, and optionally at least one olefinic unsaturation, and further optionally, at least one further hydroxyl group, wherein no two hydroxyl groups may be on the same carbon atom, and if R¹ is different from R², the number of carbon atoms of R¹ is smaller than the number of carbon atoms of R² by at least one.

In any of these preferred variants, it is further preferred to add the multifunctional aldehyde A2 in two or more separate portions at a different times during the process.

Admixing a monofunctional aldehyde A1, or a monofunctional aminoplast former M, to a reaction product that has terminal >NH functional groups or terminal aldehyde functional groups, will lead to end-capping, by reaction of the terminal >NH functional group with the monofunctional aldehyde, or by reaction of a terminal aldehyde functional group with an aminoplast former molecule M that has just one >NH group. Such end-capped products have lower viscosity and can be tailored to the suggested end use by match of their viscosity with the binder resin.

On the other hand, reaction of any of the reaction products described supra having terminal aldehyde functionality on at least two chain ends with a compound having at least two >NH functional groups, or in the other alternative, reaction of any of the reaction products described supra having terminal >NH functional groups on at least two chain ends with a compound having at least two aldehyde functional groups, will lead to chain extension, thus providing a highly oligomeric or polymeric product with increased viscosity.

In a preferred embodiment, the preferably at least partially etherified products H are used as component in the cross-linker compositions according to the invention.

"Etherified" means here in a product of an addition reaction of an aldehyde to a cyclic alkyleneurea U (X being the residue of a cyclic alkyleneurea U which may have been reacted with a multifunctional aldehyde A2 or may also be part of a polymer or an oligomer chain, after taking out a —CO—NH— group):

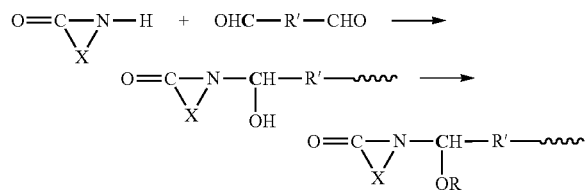

that a hydroxyl group bonded to a carbonyl carbon atom of an aldehyde molecule (denoted by bold print "C" in the formulae supra) which is generated in the addition reaction is replaced by an alkoxy group —OR. The (growing) polymer chain is denoted by "~~~~". In the case of linear ureas or other amide, amine or amidine compounds, analogous structures are formed.

In the preferred case of using ethylene urea as cyclic alkyleneurea U, and glyoxal as multifunctional aldehyde A2, —R'— is a direct bond, and —X— is —NH—CH₂—CH₂—.

"Partially etherified" means here that both —OH and —OR groups bonded to carbonyl carbon atoms of the aldehyde are present in such "partially etherified" product, which at least partially etherified reaction product has as substituents on the carbonyl carbon atoms of the aldehyde A1 or A2 at least one kind of functional groups selected from the group consisting of hydroxyl groups —OH and alkoxy groups —OR.

"Partially etherified" in the context of the present invention means preferably that the ratio of the amount of substance n(—OR) of alkoxy groups generated by etherification with alcohols of hydroxyl groups which are formed by the reaction of an aldehyde group with an n(—CO—NH) group to the sum of the amount of substance n(—OR) of said alkoxy groups and the amount of substance n(—OH) of non-etherified said hydroxyl groups is at least 0.01 mol/mol.

The aliphatic alcohols R—OH useful for the invention have at least one hydroxyl group, and from one to twelve carbon atoms, preferably one to eight carbon atoms, which may be interrupted by one or more of —O—, —NR"—, —S—, where R" stands for H, or an alkyl group having from one to six carbon atoms, with the proviso that not two —O— or not two —S— atoms may be immediately adjacent. They can be linear, branched or cyclic, preferably linear or branched, are preferably monoalcohols and preferably have from one to twelve, preferably one to eight carbon atoms, such as methanol, ethanol, n- and iso-propanol, and the isomeric butanols, particularly n-butanol, and iso-butanol, n-hexanol, or 2-ethylhexanol. Other preferred alcohols are etheralcohols of the formula $R^3$—$(O$—$C_nH_{2n})_m$—$OH$ where $R^3$ is an alkyl group having preferably from one to four carbon atoms, n is an integer of from 2 to 4, and m is an integer of from 1 to 10, such as ethylene glycol monomethylether, ethylene glycol monobutylether, triethylene glycol monoethylether, or dipropyleneglycol monomethylether. Among the cyclic aliphatic alcohols, cyclohexanol is preferred. A small amount, i.e. up to a mass fraction of 10% of the aliphatic alcohols used, may be difunctional or polyfunctional (having a functionality of three or more). In a further embodiment, olefinically unsaturated alcohols can be used for etherification, thereby leading to polymerisable reaction products P. Useful alcohols have one hydroxyl group per molecule, and at least one olefinic unsaturation. These can be unsaturated aliphatic alcohols having from three to ten carbon atoms, preferably allyl alcohol, and methallyl alcohol, or half esters of diols, or partial esters of tri-hydric and higher functional alcohols, with olefinically unsaturated carboxylic acids, such as hydroxyethyl acrylate, hydroxyethyl methacrylate, hydroxypropyl acrylate, and hydroxypropyl methacrylate. These and other unsaturated hydroxyfunctional compounds are also included in the definition of "unsaturated alcohols", for the purpose of the present invention.

It is further preferred that the degree of etherification of the product H, measured as the ratio n(RO—)/[n(—OH)+n(RO—)] of the amount of substance n(RO—) of alkoxy groups to the sum of the amounts of substance of etherified and non-etherified hydroxyl groups, is at least 0.4 mol/mol.

It is further preferred that the product H has a ratio of the amount of substance of residual >NH groups to the sum of the amounts of substance of moieties derived from the cyclic urea U and aminoplast former M of not more than 0.2 mol/mol.

Repetition of an etherification step, i.e. addition of alcohol and further etherification after optional removal of water and unreacted alcohol, has been found to increase the degree of etherification. This repetition is particularly preferable in the case of only one alcohol being used for etherification. Double or triple or multiple etherification, the number of repetitions being selected to reach the desired degree of etherification, is therefore a preferred method.

In a preferred variant, after an etherification step, at least a part of the unreacted alcohol and optionally, at least a part of the water present, and further optionally, at least a part of the at least one solvent that has no reactive groups which react with aldehyde groups, n(—CO—NH) groups, or hydroxyl groups, is removed by azeotropic distillation wherein a solvent is added that is immiscible with water in a way that it forms a phase separate from an aqueous phase containing at least a part of the water separated by distillation, wherein the phase different from the aqueous phase is recycled to the distillation still, or back to the reactor.

If a solid precipitate or a suspended solid is formed during the reaction, this solid matter is preferably separated by any of the usual processes such as centrifugation, or filtration.

It has further been found that the reaction between the cyclic urea U and the multifunctional aldehyde A2 can preferably be conducted in the presence of a solvent which does not react with either of the cyclic urea U, the multifunctional aldehyde A2, and the reaction product UA of these. This finding also applies to formation of reaction products of the aminoplast formers M and of monofunctional aldehydes A1, and of course, other combinations of these starting materials or educts. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

The at least partially etherified products H thus obtained can be combined as crosslinker composition both with solvent borne and with water borne binder resins having active hydrogen functionality (hydroxyl, amine, mercaptan, phosphine or acid groups which may be carboxylic or derived from other organically bound acids).

The preparation of a coating composition involves admixing the product H to a crosslinkable resin, and optionally, adding a catalyst which is preferably an acid catalyst, which crosslinkable resin is an oligomeric or polymeric material having at least one kind of functional groups having active hydrogen atoms, selected from the group consisting of hydroxy functional groups, acid functional groups, amide functional groups, amino functional groups, imino functional groups, mercaptan functional groups, phosphine functional groups, and carbamate functional groups, to form a coating composition.

In a preferred variant, the crosslinkable composition comprises an oligomeric or polymeric material the functional groups of which are hydroxyl groups, and the polymeric or oligomeric material is selected from the group consisting of acrylic resins, polyester resins, alkyd resins, polyurethane resins, epoxy resins, vinyl resins, polyether polyols, characterised in that the polymeric or oligomeric material has a hydroxyl number of from 5 mg/g to 300 mg/g.

In a further preferred variant, the crosslinkable composition comprises an oligomeric or polymeric material the functional groups of which are carboxyl groups or sulphonic acid groups, and the oligomeric or polymeric material is selected from the group consisting of acrylic resins, polyester resins, alkyd resins, polyurethane resins, epoxy ester resins, vinyl resins, rosin, and maleinate resins, wherein the oligomeric or polymeric material preferably has an acid number of from 5 mg/g to 300 mg/g.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxyfunctional resins include CRYL-COAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith.

In a further preferred variant, the crosslinkable composition comprises an oligomeric or polymeric material the functional groups of which are amino groups, and the oligomeric or polymeric material is selected from the group consisting of acrylic resins, polyurethane resins, epoxy amine adducts, and vinyl resins, characterised in that the oligomeric or polymeric material has an amine number of from 5 mg/g to 300 mg/g.

In a further preferred variant, the crosslinkable composition comprises an oligomeric or polymeric material the functional groups of which are carbamate functional groups, and the polymeric material is selected from the group consisting of acrylic resins, polyurethane resins, epoxy amine adducts, and vinyl resins, characterised in that the polymeric material has a specific amount of substance of carbamate groups of from 0.1 mmol/g to 6 mmol/g.

In a further preferred variant, the crosslinkable composition comprises an oligomeric or polymeric material which is present as an aqueous dispersion.

In a further preferred variant, the crosslinkable composition comprises an oligomeric or polymeric material which is present as a solution in a non-aqueous solvent.

In a further preferred variant, the crosslinkable composition comprises an oligomeric or polymeric material which is present as a particulate solid, preferably having a melting temperature in excess of 35° C.

Coating compositions are prepared by admixing the mixture comprising the product H as crosslinker to a polymeric binder resin having active hydrogen atoms, i.e. at least one of hydroxyl groups, acid groups, preferably carboxyl groups, carbamate groups, amide groups, imide groups, amino groups, imino groups, mercaptan groups, or phosphine groups. The resulting mixture is homogenised, and applied to a substrate by spraying, brushing, wire coating, curtain coating, blade coating, roll coating, dipping, electrophoretic deposition, powder spraying, or electrostatic spraying.

The ratio of mass of solids of the binder resin to the mass of the product H is preferably from 99/1 to 1/99, particularly preferably from 95/5 to 60/40, and most preferred, from 90/10 to 70/30.

As crosslinker compositions comprising the products H, when adequately catalysed, are active already at ambient temperature (20° C. to 25° C.), they are particularly useful to cure coatings on heat sensitive substrates, such as paper, cardboard, textiles, leather, wood, fabricated wood, and also plastics including composite materials, thermoplastics, and thermosets. They also work, of course, as crosslinkers for coating compositions that are used on substrates such as metals, semiconductor surfaces, ceramics, stone, plaster, glass, and concrete which allow higher curing temperatures. Application of said crosslinker composition in combination with the binder resins mentioned supra together with an appropriate catalyst can also be considered where cure temperature or energy savings are an issue.

Suitable catalysts are preferably acid catalysts, particularly those selected from the group consisting of organic sulphonic acids, organic phosphonic acids, organic sulphonimides, and Lewis acids, or salts or complexes of Lewis acids such as amine salts or ether complexes. Useful catalysts are para-toluene sulphonic acid (pTSA), dodecylbenzene sulphonic (DDBSA), dinonylnaphthalene sulphonic acid (DNNSA), and dinonyl naphthalene disulphonic acid (DNNDSA), which may also be blocked with volatile amines. Particularly preferred are N-methylsulphonyl-p-toluenesulphonamide (MTSI), para-toluene sulphonic acid (pTSA), do-decylbenzene sulphonic (DDBSA), dinonyl-naphthalene sulphonic acid (DNNSA), and dinonyl naphthalene disulphonic acid (DNNDSA). Blocked acid catalysts where the acid is liberated e.g. by heating can, of course, also be used, such as acid esters or reaction products of acids and epoxide functional compounds. Particularly useful catalysts are acid catalysts, such as toluene sulphonic acid, or dinonyl naphthalene disulphonic acid, which are usually dissolved in alcohol.

Usual additives such as organic solvents, coalescing agents, defoamers, levelling agents, fillers, pigments, light stabilisers, antioxydants, colourants, flow control agents, sag control agents, antiskinning agents, antisettling agents, adhesion promoters, wetting agents, preservatives, plasticisers, mould release agents, and corrosion inhibitors can, of course, be used in coating compositions comprising the crosslinker compositions of the present invention.

The crosslinker compositions of this invention may be applied as such preferably to heat-sensitive substrates selected from the group consisting of paper, textiles, wood, fabricated wood, leather, or cellulosic materials, for which purpose they may be mixed with at least one of catalysts, fillers, wetting agents, solvents, and diluents, and applied to the substrate.

The curable compositions of this invention may preferably be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. They can also be used in electronic applications, including coatings for metallised circuit boards, semiconductor surfaces, displays, and packaging for electronic circuitry.

The coating compositions can be applied by any of the known techniques such as spraying, dipping, brushing, wire coating, curtain coating, and using a doctor blade. If formulated as solids, they may also be used as crosslinkers in powder coating compositions, and may be applied by the usual methods such as electrostatic spraying, or powder spraying.

EXAMPLES

The following examples illustrate the invention, without intending to limit. All concentrations (strengths) and ratios stated in "%" are mass fractions (ratio of the mass $m_B$ of a specific substance B, divided by the mass in of the mixture, in the case of a concentration, or by the mass $m_D$ of the second substance D, in the case of a ratio). The acid number is defined, according to DIN EN ISO 3682 (DIN 53 402), as the ratio of that mass $m_{KOH}$ of potassium hydroxide which is needed to neutralise the sample under examination, and the mass ins of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide $M_{KOH}$ having the same number of hydroxyl groups as the sample, and the mass $m_B$ of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol".

$^{13}$C-NMR analyses have been done with a Bruker-Oxford Avance II 400 NMR spectrometer with a 100 mm probe. Samples were prepared by diluting the reaction products with approximately the same mass of dimethyl sulphoxide-$d_6$.

Measurement of molar mass of the reaction products was done by HPSEC, or gel permeation chromatography, using tetrahydrofuran as solvent, at a sample concentration of 1 g/100 ml, a flow of 1.0 ml/min, a column temperature of 40° C., and refractometric detection, using a set of crosslinked polystyrene bead filled columns having a particle diameter of 5 im, with pore sizes of 100 nm (1×), 50 nm (2×), and 10 nm (3×), providing a measuring range of from 100 g/mol to 50 kg/mol, for calibration with polystyrene standards. Data collection and analysis was made with a software provided by Polymer Standards Service WinGPC system.

Example 1

A resin according to the invention was prepared by the following procedure:

297 g (2.05 mol) of an aqueous solution of glyoxal (ethane dial, with a mass fraction of solute of 40%) were charged to a 0.5 L reaction vessel under a nitrogen purge. 41 g (0.68 mol) of solid urea were added slowly over fifteen minutes, and the resulting mixture was heated to a temperature of between 40° C. and 45° C. and held for two hours under stirring, resulting in the in-situ formation of 4,5-dihydroxy ethylene urea (DHEU) and its reaction product with glyoxal. The pH was adjusted to 4.5 by addition of aqueous sodium bicarbonate solution having a mass fraction of solids of 10%, to effect further reaction of DHEU with glyoxal, and held under stirring for one hour at the stated temperature. At the end of this period, 66 g (0.68 mol) of ethylene urea hemihydrate (2-imidazolidinone) were added, pH was adjusted to 6.5 by addition of aqueous sodium bicarbonate solution, and the resulting mixture was heated to a temperature of between 40° C. and 50° C. and held for two hours under stirring. Thereafter, 474 g (14.8 mol) of methanol were added. The pH was adjusted to about 2.6 by addition of aqueous sulphuric acid with a mass fraction of solute of 25%, and the reaction temperature was then raised and maintained at (45±3)° C. for two hours. At the end of the methylation step, pH of the reaction mixture was adjusted to approximately 6.6 by addition of an aqueous solution of sodium hydroxide (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about two hours. At the end of this distillation, 495 g (6.7 mol) of 1-butanol were added and pH was readjusted to about 2.0 by addition of aqueous sulfuric acid (as supra). The reaction temperature was again maintained at (48±3)° C. for 2.5 hours. At the end of two and one half hours of butylation the pH of the reaction mixture was then adjusted to approximately 6.7 by addition of aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 352 g (4.76 mol) of 1-butanol were added and pH was readjusted to about 1.5 with aqueous sulphuric acid (as supra). The reaction temperature was again maintained at (48±3)° C. for two hours. At the end of this second butylation the pH of the reaction mixture was then adjusted to approximately 6.5 with aqueous sodium hydroxide solution (as supra). The reaction temperature was then raised to (55±5)° C. for removal of excess butanol, methanol and water under reduced pressure (16 kPa slowly linearly decreased to 6.7 kPa, equivalent to 120 mm Hg ramped to 50 mm Hg) until a crosslinker resin was obtained, hereinafter referred to as "Crosslinker 1", having a mass fraction of solids of 67%, and a dynamic viscosity of approximately 1400 mPa·s.

The degree of alkylation and molar mass of the resulting yellow crosslinker solution were determined by C-13 NMR (n(—O-Alkyl)/n(>C=O)=1.18 mol/mol; ">C=O" stands for the total of carbonyl groups in urea and ethylene urea, and by HPSEC (Mw=1390 g/mol, Mw stands for the weight average molar mass) analyses. The ratio n(—OBu)/n(—OMe) of the amount of substance n(—OBu) of n-butoxy groups to the amount of substance n(—OMe) of methoxy groups in the reaction products was 6.24 mol/1.0 mol.

This mixed ether hybrid product when evaluated in ambient (23° C.) cured surface coating applications resulted in coating films with good appearance, satisfactory resistance properties, and superior formulation stability. For this test, clear coating compositions were prepared from Crosslinker 1 (17.9 g), and for comparison, from a mixture ("Crosslinker 1C") of 20 g of an n-butylated urea formaldehyde resin "Crosslinker 1C1" dissolved in n-butanol and having a mass fraction of solids of 60%, with an amount of substance-ratio of urea to combined formaldehyde to n-butoxy groups of 1 mol:2.3 mol:1.0 mol, and a weight average molar mass of 3300 g/mol with 4.2 g of a fully butylated melamine formaldehyde resin "Crosslinker 1C2" having a mass fraction of solids of approximately 99%, with an amount of substance-ratio of melamine to combined formaldehyde to n-butoxy groups of 1 mol:5.9 mol:4.6 mol, and having a weight-average molar mass of 2300 g/mol, with a short oil alkyd resin ("Alkyd Resin", used also in the other examples unless specifically mentioned) based on coconut oil dissolved in xylene with a mass fraction of solids of 60%, having an acid number of 12 mg/g, and a hydroxyl number of 155 mg/g (Beckosol® 12-035, Reichhold Chemicals), according to the following recipe:

TABLE 1.1

Recipes of Coating Compositions C1 and C1C

| | Coating Composition | |
|---|---|---|
| | C1 | C1C |
| Alkyd Resin | 46.7 g | 40.0 g |
| Crosslinker | Crosslinker 1, 17.9 g | Crosslinker 1C, 24.2 g |
| Methoxypropanol | 0.8 g | 0.8 g |
| Catalyst | Catalyst 1, 0.8 g | Catalyst 2, 4.0 g |
| n-Butanol | 8.0 g | 8.0 g |
| n-Butyl Acetate | 25.8 g | 23.0 g |

Catalyst 1 is a solution of dinonylnaphthalene sulphonic acid in isobutanol with a mass fraction of solids of 40%, and Catalyst 2 is a solution of para-toluene sulphonic acid in isopropanol with a mass fraction of solids of 40%.

The following properties were measured on glass plates whereon the coating compositions C1 and C1C had been applied by a wire-wound coating bar designated as "#65".

TABLE 1.2

Coating Performance after Ambient Cure (23° C.)

| | Coating Composition | |
|---|---|---|
| | C1 | C1C |
| Substrate | Glass | Glass |
| Film appearance | good | good |
| Hardness after 24 h, Koenig in s | 62 | 117 |
| Hardness after 11 d, Koenig in s | 117 | 157 |

(1A.2) Example 2

Methyl ether of 4,5 alkoxy 2-Imidazolidinone and 2-Imidazolidinone-Ethanedial Resin (OMe=2.3)

Concept: stepwise reaction of 4,5 dimethoxyEU with GO followed by reaction with EU.

A resin according to the invention was prepared by the following procedure:

100 g (0.68 mol) of an aqueous solution of glyoxal (ethane dial, with a mass fraction of solute of 40%) were charged to a reaction vessel under a nitrogen purge and the pH was adjusted to 6.5 with solid sodium bicarbonate. 50 g (0.34 mol) of dimethoxyethylene urea (4,5 dimethoxy 2-imidazolidinone, solid) were added and the resulting mixture was heated to a temperature of between 40° C. and 50° C. and held for three to eight hours under stirring. At the end of this period, 29.3 g (0.34 mol) of ethylene urea (2-imidazolidinone, solid) were added and the pH was adjusted to between 6.5 and 7.0 with solid sodium bicarbonate. The resulting mixture was heated to a temperature of between 40° C. and 50° C. and held for four hours under stirring. A non-etherified product with mass fraction of solids of 70% was obtained. 80 g of this non-etherified product were transferred to another reactor and 109 g (3.4 mol) of methanol were added. The pH was adjusted to about 2.5 with aqueous sulphuric acid (with a mass fraction of solute of 25%) and the reaction temperature was then raised and maintained at (48±3)° C. for three hours. At the end of three hours of methylation the pH of the reaction mixture was then adjusted to approximately 6.5 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) until a mass fraction of approximately from 36% to 40% of the total reaction mass had been removed. The resulting product was further methylated by reaction with 109 g (3.4 mol) of methanol. The pH was adjusted to about 2.5 with aqueous sulphuric acid (with a mass fraction of solute of 25%) and the reaction temperature was then raised and maintained at (48±3)° C. for three hours. At the end of three hours of methylation the pH of the reaction mixture was then adjusted to approximately 6.5 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) until a product ("Crosslinker 2") with a mass fraction of solids of 82% were obtained.

The degree of alkylation and molar mass of the resulting straw yellow crosslinker solution (70 g) were determined by C-13 NMR (n(—O-Alkyl)/n(total carbonyl)=2.3 mol/mol; "Total carbonyl" stands for the carbonyl groups from the 2-imidazolidinone derivative and ethylene urea, and by HPSEC ($M_w$=610 g/mol, $M_w$ stands for the weight average molar mass) analyses. The degree of alkylation of the aldehyde carbon atoms, expressed as the ratio of the amount of substance of alkoxy groups bound to the aldehyde carbon atoms, to the amount of substance of carbonyl carbon atoms in the cyclic alkylene urea, was calculated to be 1.65 mol/mol.

This Crosslinker 2 (methyl ether product) when evaluated in ambient and heat cured surface coating applications resulted in coating films with good appearance, satisfactory resistance properties comparable to formulations using a urea-formaldehyde resin "Crosslinker 2C" having a ratio of amount of substance of urea to the amount of substance of combined formaldehyde of 1 mol:2.7 mol, and a ratio of the amount of substance of urea to the amount of substance of combined methanol of 1 mol:1.7 mol, as crosslinker. It was also noted that Crosslinker 2 has a superior formulation stability.

Coating compositions were prepared with the Alkyd Resin of Example 1 comprising Crosslinker 2 according to the invention (Coating Composition C2), and a comparative coating composition (Coating Composition C2C) with Crosslinker 2C, and applied to electroplated steel panels (ED-5050).

TABLE 2.1

Coating Composition

| | Coating Composition | |
|---|---|---|
| | C2 | C2C |
| Crosslinker of | Example 2 (Crosslinker 2) | Control Example (Crosslinker 2C) |
| Alkyd Resin, Solid Resin | 58.3 g | 58.3 g |
| Crosslinker, Solid Resin | Crosslinker 2, 18.3 g | Crosslinker 2C, 15.3 g |
| Methoxypropanol | 1.0 | 1.0 |
| Catalyst | Catalyst 2, 2.5 g | Catalyst 2, 2.5 g |
| 1-Butanol | 10.0 | 10.0 |
| ethanol | 12.9 | 10.0 |

TABLE 2.2

Coating Performance using "ED 5050" electrodeposition-primed steel panels, and a Wire-wound coating bar #65, curing was performed at 65° C. for twenty minutes.

| | Coating Composition | |
|---|---|---|
| | C2 | C2C |
| Crosslinker | Crosslinker 2 | Crosslinker 2C |
| Film appearance | good | good |
| Hardness after 24 h, Koenig in s | 119 | 113 |
| MEK resistance | 200 (70%) | 200 (10%) | under MEK resistance, the number of double rubs is recorded until the coating film is damaged. The percentage shown stands for the damaged area after 200 double rubs (the test is finished after 200 double rubs).

Example 3

(1B.1) Ethyl ether of Urea and 2-Imidazolidinone-Ethanedial Resin at 60/40 ratio A resin according to the invention was prepared by the following procedure:

73 g (0.5 mol) of an aqueous solution of glyoxal (ethane dial, with a mass fraction of solute of 40%), 230.5 g (5.0 mol) of ethanol, and 3.1 g (0.05 mol) of boric acid were charged to a 0.5 L reactor. Urea (15 g, 0.25 mol) was then added over a nine minute period. pH of reaction solution after urea addition was 2.41, which needed no further adjustment. The reaction mixture was heated to 55° C. and held for 5 hours. 13.8 g (0.16 mol) of ethylene urea hemihydrate (2-Imidazolidinone, solid with a mass fraction of 90%) was then added and the reaction mixture was heated at 50° C. for an additional 4 hours. The resulting product had an APHA color value of 38. The reaction mixture was then concentrated under reduced pressure until a product with a mass fraction of solids of 70% were obtained. The degree of alkylation and molar mass of the resulting viscous very pale yellow oil crosslinker solution were determined by C-13 NMR (n(—O-Alkyl)/n(total carbonyl)=1.31 mol/mol; "Total carbonyl" stands for the carbonyl groups from the 2-imidazolidinone derivative and ethylene urea, and by HPSEC ($M_w$=534 g/mol, $M_w$ stands for the weight average molar mass) analyses.

This crosslinker product was evaluated in ambient and heat cured surface coating applications and resulted in coating films with good appearance, and satisfactory resistance properties comparable to formulations using amino-formaldehyde resins as crosslinkers.

(1B.2) Example 4

Ethyl ether of Urea and 2-Imidazolidinone-Ethanedial Resin at 67/33 ratio

A resin according to the invention was prepared by the following procedure:

58.1 g (0.4 mol) of an aqueous glyoxal solution with a solids content of 40%, 184 g (4.0 mol) of ethanol, 2.5 g (0.04 mol) of boric acid and 15 g (0.25 mol) of urea were charged to a 0.5 L reactor. Initial pH of reaction solution was 2.48, which needed no further adjustment. The reaction mixture was heated to 55° C. and held for five hours. The reaction mixture was then concentrated under reduced pressure to afford 89.0 g of slightly viscous oil. 138 g (3.0 mol) of ethanol was added followed by 10.6 g (0.123 mol) of EU and the reaction mixture was heated at 55° C. for an additional two hours. The reaction mixture was then concentrated under reduced pressure until a product (Crosslinker 4) with a mass fraction of solids of 82% were obtained. The degree of alkylation and molar mass of the resulting viscous very pale yellow oil crosslinker solution (81 g) were determined by C-13 NMR (n(—O-Alkyl)/n(total carbonyl)=1.41 mol/mol; "Total carbonyl" stands for the carbonyl groups from the 2-imidazolidinone derivative and ethylene urea, and by HPSEC ($M_w$=371 g/mol, $M_w$ stands for the weight average molar mass) analyses.

TABLE 4.1

Coating Compositions

| | Coating Composition | |
|---|---|---|
| | C4 | C4C |
| Crosslinker of | Example 4 (147A) | Comparative Example |
| Alkyd Resin | 58.4 g | 58.4 |
| Crosslinker | Crosslinker 4, 20.1 g | Crosslinker 2C1, 15.6 g |
| Methoxy Propanol | 1.0 g | 1.0 g |
| Catalyst 2 | 2.5 g | 2.5 g |
| 1-Butanol | 10.0 g | 10.0 g |
| Ethanol | 8.0 g | 12.5 g |

TABLE 4.2

Coating Performance measured on ED 5050 steel sheets, curing at 65° C. for five minutes, Film applied by wound wire coater #65

| | Coating Composition | |
|---|---|---|
| | C4 | C4C |
| Crosslinker of Example | 4 | 2C1 (comparative) |
| Film appearance | good | good |
| Hardness after 24 h, Koenig in s | 44 | 53 |
| MEK resistance | 150 | 200-50% loss |

(1B.3) Example 5

Preparation of Butyl Methyl ether of 2-Imidazolidinone and Urea-Ethanedial Resin (Butyl, Methyl EU-GO-Urea Hybrid) Under Acidic Conditions A resin according to the invention was prepared by the following procedure:

370 g (2.55 mol) of an aqueous solution of glyoxal (ethane dial, with a mass fraction of solute of 40%) were charged to a 0.5 L reaction vessel under a nitrogen purge. 51 g (0.85 mol) of urea solid were added slowly over 15 minutes and the resulting mixture was heated to a temperature of between 40° C. and 45° C. and held for two and one half hours under stirring, resulting in the in-situ formation of 4,5 dihydroxy ethylene urea (DHEU) and its reaction product with glyoxal The molar mass was determined by HPSEC ($M_w$=358 g/mol, $M_w$ stands for the weight average molar mass) analyses. To 210 g of this product, 41 g (0.89 mol) of ethylene urea hemihydrate (2-imidazolidinone solid) were added; pH was measured to be 2.87 and needed no further adjustment. The resulting mixture was heated to a temperature of between 40° C. and 50° C. and held for two hours under stirring. The molar mass was determined by HPSEC ($M_w$=498 g/mol, $M_w$ stands for the weight average molar mass) analyses.

125 g of this product was transferred to a reaction vessel under nitrogen purge. At this point 204 g (6.4 mol) of methanol were added and the pH was adjusted to about 2.6 with aqueous sulphuric acid (with a mass fraction of solute of 25%) and the reaction temperature was then raised and maintained at (45±3)° C. for three hours. At the end methylation the pH of the reaction mixture was then adjusted to approximately 6.6 with aqueous sodium hydroxide solution (mass fraction of solids of 25%). 118 g (1.59 mol) 1-butanol were added and excess water, methanol and butanol were removed slowly under reduced pressure until a mass fraction of solids of 48% were obtained.

The degree of alkylation and molar mass of the resulting yellow crosslinker solution were determined by C-13 NMR (n(-O-Alkyl)/n(total carbonyl EU+Urea)=1.61 mol/mol; "EU" stands for ethylene urea, and by HPSEC ($M_w$=1340 g/mol, $M_w$ stands for the weight average molar mass) analyses. The ratio of the amount of substance of n-butoxy groups to the amount of substance of methoxy groups in the reaction products was 0.89 mol/1.0 mol.

This mixed ether hybrid product when evaluated in ambient cured surface coating applications resulted in coating films with good appearance, satisfactory resistance properties comparable to formulations using amino-formaldehyde resins as crosslinkers and superior formulation stability.

(2.1) Example 6

Preparation of Butyl Methyl ether of 2-Imidazolidinone and Urea-Ethanedial Resin to form a Butyl, Methyl EU-GO-Urea Chain Extended Hybrid A resin according to the invention was prepared by the following procedure:

126 g (0.87 mol) of an aqueous solution of glyoxal (ethane dial, with a mass fraction of solute of 40%) were charged to a 0.5 L reaction vessel under a nitrogen purge and the pH was adjusted with aqueous sodium bicarbonate solution (with a mass fraction of solids of 10%) to 6.2. 69 g (0.73 mol) of ethylene urea hemihydrate (2-imidazolidinone, solid) were added and the resulting mixture was heated to a temperature of between 40° C. and 45° C. and held for two hours under stirring. At the end of this period, 11 g (0.18 mol) of urea (solid) were added and the resulting mixture was heated to a temperature of between 40° C. and 50° C. and held for two hours under stirring. At this point 160 g (5.0 mol) of methanol were added. The pH was adjusted to about 2.4 with aqueous sulphuric acid (with a mass fraction of solute of 25%) and the reaction temperature was then raised and maintained at (48±3)° C. for three hours. At the end of two hours of methylation the pH of the reaction mixture was then adjusted to approximately 6.6 with aqueous sodium hydroxide solution (mass fraction of solids of 25%). The molar mass of the resulting dilute crosslinker solution was determined by HPSEC ($M_w$=2254 g/mol, $M_w$ stands for the weight average molar mass) analyses. Excess methanol and water were removed slowly under reduced pressure (25.333 kPa slowly linearly decreased to 16 kPa, equivalent to 190 mm Hg ramped to 120 mm Hg) over a period of about two hours. At the end of this distillation, 126 g (1.70 mol) of 1-butanol were added and pH was readjusted to about 2.5 with aqueous sulphuric acid (as supra). The reaction temperature was again maintained at (48±3)° C. for 2.5 hours. At the end of two and one half hours of butylation the pH of the reaction mixture was then adjusted to approximately 6.5-7.0 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 152 g (2.05 mol) of 1-butanol were added and pH was readjusted to about 1.8 with aqueous sulphuric acid (as supra). The reaction temperature was again maintained at (48±3)° C. for two and one half hours. At the end of this second butylation the pH of the reaction mixture was then adjusted to approximately 6.5 with aqueous sodium hydroxide solution (as supra). The reaction temperature was then raised (55±5)° C. for the removal of excess butanol, methanol and water under reduced pressure (16 kPa slowly linearly decreased to 6.7 kPa, equivalent to 120 mm Hg ramped to 50 mm Hg) until a crosslinker resin "crosslinker 6" was obtained having a dynamic viscosity of approximately 1400 mPa·s and a mass fraction of solids of 64%.

The degree of alkylation and molar mass of the resulting yellow crosslinker solution were determined by C-13 NMR (n(—O-Alkyl)/n(total carbonyl EU+Urea)=1.35 mol/mol; "EU" stands for ethylene urea, and by HPSEC ($M_w$=3148 g/mol, $M_w$ stands for the weight average molar mass) analyses. The ratio of the amount of substance of n-butoxy groups to the amount of substance of methoxy groups in the reaction products was 4.57 mol/1.0 mol.

This mixed ether hybrid product when evaluated in ambient cured surface coating applications resulted in coating films with good appearance, and satisfactory resistance properties.

TABLE 6.1

Coating Composition (masses in g)

| Crosslinker of | Coating Composition | |
|---|---|---|
| | 6.1 | 6C |
| Crosslinker of | Example 6 | Comparative Example |
| Alkyd Resin | 52.6 | 45.0 |
| Crosslinker of this Example | 21.2 | 0 |
| Crosslinker 1C1 | 0 | 22.5 |
| Crosslinker 1C2 | 0 | 4.7 |
| Methoxy Propanol | 0.9 | 0.9 |
| Catalyst 1 | 0.9 | 0 |
| Catalyst 2 | 0 | 4.5 |
| 1-Butanol | 9.0 | 9.0 |
| Butyl Acetate | 15.4 | 13.4 |

TABLE 6.2

Coating Performance films applied with a wire wound coater #65 on electroplated cold rolled steel sheets (CRSB-1000)

| | Coating Composition | |
|---|---|---|
| | 6.1 | 6C |
| Crosslinker of Example | 6 | 1C2 (comparative) |
| Substrate | ED CRS B-1000 | ED CRS B-1000 |
| Formulation Solids | 45% | 45% |
| Ambient Cure (23° C.) | | |
| Film appearance | good | good |
| Hardness 48 h, Konig Hardness | 120 s | 179 s |
| MEK resistance | 25 sls/200 v s | 50 sls/200 sls | note
MEK sl = slight, s = scratched, v = very, nm = no mar,
Print - 0 = no mar, 5 = very marred Comparative Example 7

Showing Lower Mw in Absence of Urea Addition for Chain Extension

A resin according without urea addition was prepared by the following procedure:

126 g (0.87 mol) of an aqueous solution of glyoxal (ethane dial, with a mass fraction of solute of 40%) were charged to a 0.5 L reaction vessel under a nitrogen purge and the pH was adjusted with aqueous sodium bicarbonate solution (with a mass fraction of solids of 10%) to 6.2. 69 g (0.73 mol) of ethylene urea hemihydrate (2-imidazolidinone, solid) were added and the resulting mixture was heated to a temperature of between 40° C. and 45° C. and held for two hours under stirring. At this point 100 g (3.2 mol) of methanol were added. The pH was adjusted to about 2.4 with aqueous sulphuric acid (with a mass fraction of solute of 25%) and the reaction temperature was then raised and maintained at (48±3)° C. for three hours. At the end of two hours of methylation the pH of the reaction mixture was then adjusted to approximately 6.6 with aqueous sodium hydroxide solution (mass fraction of solids of 25%). The molar mass of the resulting dilute crosslinker solution was determined by HPSEC ($M_w$=1207 g/mol, $M_w$ stands for the weight average molar mass) analyses.

TABLE 7

HPSEC Mw Comparison

| | | Mw in g/mol |
|---|---|---|
| Methylated 2-Imidazolidone-Urea-Ethanedial Resin (1$^{st}$ alkylation step) | Example 6 | 2254 |
| Methylated 2-Imidazolidone-Ethanedial Resin (1$^{st}$ alkylation step) | Comparative Example 7 | 1207 |

(2.2) Example 8

Preparation of Nonetherified 2-Imidazolidinone and Acetoguanamine-Ethanedial Resin to Form an EU-GO-Acetoguanamine Chain Extended Hybrid A resin according to the invention was prepared by the following procedure:

46 g (0.33 mol) of an aqueous solution of glyoxal (ethane dial, with a mass fraction of solute of 40%) were charged to a 0.1 L reaction vessel under a nitrogen purge and the pH was adjusted with aqueous sodium bicarbonate solution (with a mass fraction of solids of 10%) to 6.2. 26.6 g (0.28 mol) of ethylene urea hemihydrate (2-imidazolidinone, solid) were added and the resulting mixture was heated to a temperature of between 40° C. and 45° C. and held for two hours under stirring. At the end of this period, 1.75 g (0.014 mol) of acetoguanamine (solid) were added and the resulting mixture was heated to a temperature of between 40° C. and 50° C. and held for two hours under stirring. At this point 31 g (0.99 mol) of methanol were added. The pH was adjusted to about 2.7 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). The molar mass of the resulting dilute crosslinker solution was determined by HPSEC ($M_w$=728 g/mol, $M_w$ stands for the weight average molar mass) analyses. C-13 NMR analyses and thin layer chromatography using 90:10 methylene chloride:methanol elutant on silica gel plate indicated incorporation of the acetoguanamine.

(2.3) Example 9

Preparation of nonetherified 2-Imidazolidinone and melamine-Ethanedial Resin to Form a Chain Extended Hybrid A resin according to the invention was prepared by the following procedure:

46 g (0.33 mol) of an aqueous solution of glyoxal (ethane dial, with a mass fraction of solute of 40%) were charged to a 0.1 L reaction vessel under a nitrogen purge and the pH was adjusted with aqueous sodium bicarbonate solution (with a mass fraction of solids of 10%) to 6.2. 26.6 g (0.28 mol) of ethylene urea hemihydrate (2-imidazolidinone, solid) were added and the resulting mixture was heated to a temperature of between 40° C. and 45° C. and held for two hours under stirring. At the end of this period, 1.77 g (0.014 mol) of melamine crystal (solid) were added and the resulting mixture was heated to a temperature of between 40° C. and 50° C. and held for two and one half hours under stirring. At the end of this period, an additional 1.77 g (0.014 mol) of melamine crystal (solid) were added and the resulting mixture was heated to a temperature of between 40° C. and 50° C. and held for two hours under stirring. The molar mass of the resulting non-etherified crosslinker solution was determined by HPSEC ($M_w$=728 g/mol, $M_w$ stands for the weight average molar mass) analyses. C-13 NMR analyses indicated incorporation of the melamine after each addition.

(2.4) Example 10

Preparation of nonetherified 2-Imidazolidinone and melamine-Ethanedial Resin to Form a Chain Extended Hybrid A resin according to the invention was prepared by the following procedure:

254.6 g (1.76 mol) of an aqueous solution of glyoxal (ethane dial, with a mass fraction of solute of 40%) were charged to a 0.5 L reaction vessel under a nitrogen purge and the pH was adjusted with aqueous sodium bicarbonate solution (with a mass fraction of solids of 10%) to 6.2. 151.8 g (1.59 mol) of ethylene urea hemihydrate (2-imidazolidinone, solid) were added and the resulting mixture was heated to a temperature of between 40° C. and 45° C. and held for three hours under stirring. At the end of this period, pH was adjusted with aqueous sodium bicarbonate solution (as supra) to 7.0, following which 31.0 g (0.24 mol) of melamine crystal (solid) were slowly added and the resulting mixture was heated to a temperature of between 40° C. and 50° C. and held for three hours under stirring. As the reaction progressed a clear viscous pale yellow of non-etherified crosslinker product with a dynamic viscosity of approximately 2000 mPa·s and a mass fraction of solids of 61.5% was obtained. The molar mass of the resulting non-etherified crosslinker solution was determined by HPSEC ($M_w$=530 g/mol, $M_w$ stands for the weight average molar mass) analyses indicating incorporation of the melamine. C-13 NMR and infra-red spectroscopy analyses indicated incorporation of melamine into the crosslinker.

(2.5) Example 11

Preparation of methyl ether of 2-Imidazolidinone and N,N',N"-trimethyl melamine-Ethanedial Resin to Form a Chain Extended Hybrid A resin according to the invention was prepared by the following procedure:

46 g (0.33 mol) of an aqueous solution of glyoxal (ethane dial, with a mass fraction of solute of 40%) were charged to a 0.1 L reaction vessel under a nitrogen purge and the pH was adjusted with aqueous sodium bicarbonate solution (with a mass fraction of solids of 10%) to 6.2. 26.6 g (0.28 mol) of ethylene urea hemihydrate (2-imidazolidinone, solid) were added and the resulting mixture was heated to a temperature of between 40° C. and 45° C. and held for two hours under stirring. At the end of this period, 3.2 g (0.019 mol) of N,N',N"-trimethyl melamine (solid) were added and the resulting mixture was heated to a temperature of between 40° C. and 50° C. and held for two hours under stirring. At this point 90 g (2.8 mol) of methanol were added. The pH was adjusted to about 2.7 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). The molar mass of the resulting dilute crosslinker solution was determined by HPSEC ($M_w$=1590 g/mol, $M_w$ stands for the weight average molar mass) analyses. C-13 NMR analyses showed incorporation of the N,N',N"-trimethyl melamine.

(3.1) Example 12

Preparation of a Butyl Methyl ether of 2-Imidazolidinone and butyl carbamate-Ethanedial Resin to Form an End Capped Hybrid A resin according to the invention was prepared by the following procedure:

280 g (1.93 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 154 g (1.62 mol) of ethylene urea hemihydrate (2-imidazolidinone, solid) were added and the resulting mixture was heated to a temperature of between 40° C. and 45° C. and held for two hours under stirring. At the end of this period 415 g (12.94 mol) of methanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about 3.5 hours. At the end of this distillation, 275 g (3.70 mol) of 1-butanol were added and pH was readjusted to about 2.26 with aqueous sulphuric acid (as supra). The reaction temperature was again maintained at (48±3)° C. for 2.5 hours. At the end of two and one half hours of butylation the pH of the reaction mixture was then adjusted to approximately 6.5 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 331 g (4.46 mol) of 1-butanol were added and pH was readjusted to about 1.8 with aqueous sulphuric acid (as supra). The reaction temperature was again maintained at (48±3)° C. for two hours. At the end of two hours of this second butylation the pH of the reaction mixture was then adjusted to approximately 6.5 with aqueous sodium hydroxide solution (as supra). The reaction temperature was then raised (55±5)° C. for the removal of excess butanol, methanol and water under reduced pressure (16 kPa slowly linearly decreased to 6.7 kPa, equivalent to 120 mm Hg ramped to 50 mm Hg) until a mass fraction of solids of 65.3% were obtained.

The degree of alkylation and molar mass of the resulting yellow crosslinker solution (479 g) were determined by C-13 NMR (n(—O-Alkyl)/n(EU)=1.74 mol/mol; "EU" stands for ethylene urea, and by HPSEC ($M_w$=2898 g/mol, $M_w$ stands for the weight average molar mass) analyses. The ratio of the amount of substance of n-butoxy groups to the amount of substance of methoxy groups in the reaction products was 2.48 mol/1.0 mol.

50 g of above product was charged to a 0.1 L charged to a reaction vessel under a nitrogen purge. 1.02 g (0.008 mol) 1-butyl carbamate was added and the resulting mixture was heated to a temperature of between 40° C. and 45° C. and held for two hours under stirring until the butyl carbamate dissolved. The reaction mass was cooled and the pH was adjusted to about 2.0 to 2.5 with aqueous sulphuric acid (with a mass fraction of solute of 25%) and the reaction temperature was then raised and maintained at (48±3)° C. for three and one half hours. At the end of this period the pH of the reaction mixture was then adjusted to approximately 5.6 with aqueous sodium hydroxide solution (mass fraction of solids of 25%).

The molar mass of the resulting crosslinker solution was determined by HPSEC ($M_w$=5300 g/mol, $M_w$ stands for the weight average molar mass) analyses. C-13 NMR analyses indicated incorporation of the butyl carbamate species into the crosslinker.

This mixed ether hybrid product when evaluated in ambient and heat cured surface coating applications resulted in coating films with good appearance, satisfactory resistance properties comparable to formulations using amino-formaldehyde resins as crosslinkers and superior formulation stability.

(3.2) Example 13

Preparation of a Butyl Methyl ether of 2-Imidazolidinone and butyl carbamate-Ethanedial Resin to Form an End Capped Hybrid A resin according to the invention was prepared by the following procedure:

280 g (1.93 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 154 g (1.62 mol) of ethylene urea hemihydrate (2-imidazolidinone, solid) were added and the resulting mixture was heated to a temperature of between 40° C. and 45° C. and held for two hours under stirring. At the end of this period 415 g (12.94 mol) of methanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about 3.5 hours. At the end of this distillation, 275 g (3.70 mol) of 1-butanol were added and pH was readjusted to about 2.26 with aqueous sulphuric acid (as supra). The reaction temperature was again maintained at (48±3)° C. for 2.5 hours. At the end of two and one half hours of butylation the pH of the reaction mixture was then adjusted to approximately 6.5 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 331 g (4.46 mol) of 1-butanol were added and pH was readjusted to about 1.8 with aqueous sulphuric acid (as supra). 9.5 g (0.08 mol) butyl carbamate was added and the reaction temperature was again maintained at (48±3)° C. for two hours. At the end of two hours of this second butylation the pH of the reaction mixture was then adjusted to approximately 6.5 with aqueous sodium hydroxide solution (as supra). The reaction temperature was then raised (55±5)° C. for the removal of excess butanol, methanol and water under reduced pressure (16 kPa slowly linearly decreased to 6.7 kPa, equivalent to 120 mm Hg ramped to 50 mm Hg) until a mass fraction of solids of 65.3% were obtained. C-13 NMR analyses indicated incorporation of the butyl carbamate species into the crosslinker. This mixed ether hybrid product when evaluated in ambient and heat cured surface coating applications resulted in coating films with good appearance, satisfactory resistance properties comparable to formulations using amino-formaldehyde resins as crosslinkers and superior formulation stability.

(3.3) Example 14

Preparation of a Butyl Methyl ether of 2-Imidazolidinone and hydroxyethyl 2-Imidazolidinone-Ethanedial Resin to Form an End Capped Hybrid. (Butyl, Methyl EU-GO-HEEU Hybrid)

A resin according to the invention was prepared by the following procedure:

280 g (1.93 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 154 g (1.62 mol) of ethylene urea hemihydrate (2-imidazolidinone, solid) were added and the resulting mixture was heated to a temperature of between 40° C. and 45° C. and held for two hours under stirring. At the end of this period, 25 g (0.19 mol) of hydroxyethyl ethylene urea (hydroxylethyl 2-imidazolidinone, solid) were added and the resulting mixture was heated to a temperature of between 40° C. and 50° C. and held for two hours under stirring. At this point 415 g (12.94 mol) of methanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about 3.5 hours. At the end of this distillation, 275 g (3.70 mol) of 1-butanol were added and pH was readjusted to about 2.26 with aqueous sulphuric acid (as supra). The reaction temperature was again maintained at (48±3)° C. for 2.5 hours. At the end of two and one half hours of butylation the pH of the reaction mixture was then adjusted to approximately 6.5 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 331 g (4.46 mol) of 1-butanol were added and pH was readjusted to about 1.8 with aqueous sulphuric acid (as supra). The reaction temperature was again maintained at (48±3)° C. for two hours. At the end of two hours of this second butylation the pH of the reaction mixture was then adjusted to approximately 6.5 with aqueous sodium hydroxide solution (as supra). The reaction temperature was then raised (55±5)° C. for the removal of excess butanol, methanol and water under reduced pressure (16 kPa slowly linearly decreased to 6.7 kPa, equivalent to 120 mm Hg ramped to 50 mm Hg) until a mass fraction of solids of 68.7% were obtained.

The degree of alkylation and molar mass of the resulting yellow crosslinker solution (479 g) were determined by C-13 NMR (n(—O-Alkyl)/*total carbonyl EU+HEEU)= 1.56 mol/mol; "EU" stands for ethylene urea, and by HPSEC ($M_w$=2570 g/mol, $M_w$ stands for the weight average molar mass) analyses. The ratio of the amount of substance of n-butoxy groups to the amount of substance of methoxy groups in the reaction products was 4.57 mol/1.0 mol.

This mixed ether hybrid product when evaluated in ambient and heat cured surface coating applications resulted in coating films with good appearance, satisfactory resistance properties comparable to formulations using amino-formaldehyde resins as crosslinkers and superior formulation stability.

(3.4) Example 15

Preparation of a Butyl Methyl ether of 2-Imidazolidinone and butyl carbamate-Ethanedial Resin to Form an End Capped Hybrid A resin according to the invention was prepared by the following procedure:

280 g (1.93 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 154 g (1.62 mol) of ethylene urea hemihydrate (2-imidazolidinone, solid) were added and the resulting mixture was heated to a temperature of between 40° C. and 45° C. and held for two hours under stirring. At the end of this period 415 g (12.94 mol) of methanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about 3.5 hours. At the end of this distillation, 275 g (3.70 mol) of 1-butanol were added and pH was readjusted to about 2.26 with aqueous sulphuric acid (as supra). The reaction temperature was again maintained at (48±3)° C. for 2.5 hours. At the end of two and one half hours of butylation the pH of the reaction mixture was then adjusted to approximately 6.5 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 331 g (4.46 mol) of 1-butanol were added and pH was readjusted to about 1.8 with aqueous sulphuric acid (as supra). The reaction temperature was again maintained at (48±3)° C. for two hours. At the end of two hours of this second butylation the pH of the reaction mixture was then adjusted to approximately 6.5 with aqueous sodium hydroxide solution (as supra).

To 242 g of the above reaction product, 3.8 g (0.05 mol) melamine was added and reaction mixture held at 50° C. for two hours. The reaction temperature was then raised (55±5)° C. for the removal of excess butanol, methanol and water under reduced pressure until a mass fraction of solids of 68% were obtained.

The molar mass of the resulting crosslinker solution was determined by HPSEC=2190 g/mol, $M_w$ stands for the weight average molar mass) analyses. C-13 NMR analyses indicated incorporation of the melamine species into the crosslinker.

This mixed ether hybrid product when evaluated in ambient and heat cured surface coating applications resulted in coating films with good appearance, satisfactory resistance properties comparable to formulations using amino-formaldehyde resins as crosslinkers and superior formulation stability.

[4] Hybrids Based on the Co-Reacts with MF Resins (4.1) Example 16

Preparation of a Butyl Methyl ether of 2-Imidazolidinone-Ethanedial-melamine Formaldehyde Co-React Resin A resin according to the invention was prepared by the following procedure:

46 g (0.33 mol) of an aqueous solution of glyoxal (ethane dial, with a mass fraction of solute of 40%) were charged to a 0.1 L reaction vessel under a nitrogen purge and the pH was adjusted with aqueous sodium bicarbonate solution (with a mass fraction of solids of 10%) to 6.2. 26.6 g (0.28 mol) of ethylene urea hemihydrate (2-imidazolidinone, solid) were added and the resulting mixture was heated to a temperature of between 40° C. and 45° C. and held for two hours under stirring. At the end of this period, 8.0 g of a methylated high imino melamine-formaldehyde resin ("MHIMF") having a ratio of the amounts of substance n(M) of melamine, of combined formaldehyde n(F) and of methoxy groups n(MeO) of 1 mol:3.2 mol:1.6 mol with a mass fraction of monomer of 62% were added, and the resulting mixture was heated to a temperature of between 40° C. and 50° C. and held for two hours under stirring. At this point 99 g (3.1 mol) of methanol were added. The pH was adjusted to about 2.3 with aqueous sulphuric acid (with a mass fraction of solute of 25%) and the reaction temperature was then raised and maintained at (48±3)° C. for two hours. At the end of two hours of methylation, 180 gram of product was transferred to a reaction vessel and 226 g (3.05 mol) 1-butanol added, the pH of the reaction mixture was adjusted to about 2.6 with aqueous sulphuric acid (with a mass fraction of solute of 25%) and the reaction temperature was then raised and maintained at (48±3)° C. for three and one half hours. At the end of this period the pH was then adjusted to approximately 6.6 with aqueous sodium hydroxide solution (mass fraction of solids of 25%). The dilute product was filtered and excess water, methanol and butanol were removed slowly under reduced pressure until a mass fraction of solids of 72% was obtained.

The degree of alkylation and molar mass of the resulting yellow crosslinker solution (86 g) were determined by C-13 NMR (n(—O-Alkyl)/*total carbonyl EU)=1.88 mol/mol; "EU" stands for ethylene urea, and by HPSEC=($M_w$=994 g/mol, $M_w$ stands for the weight average molar mass) analyses. The ratio of the amount of substance of n-butoxy groups to the amount of substance of methoxy groups in the reaction products was 0.69 mol/1.0 mol. C-13 NMR analyses further indicated the incorporation of the MHIMF resin.

This mixed ether hybrid product when evaluated in ambient and heat cured surface coating applications resulted in coating films with good appearance, satisfactory resistance properties comparable to formulations using amino-formaldehyde resins as crosslinkers and superior formulation stability. This example has shown improved color on overbake cure, i.e. curing at higher temperatures for an extended period of time.

In the following table, the properties of this hybrid resin were compared to a ethylene urea-glyoxal resin ("EU-GO resin") prepared by the following procedure:

363 g (2.6 mol) of an aqueous solution of glyoxal (ethane dial, with a mass fraction of solute of 40%) were charged to a reaction vessel under a nitrogen purge and the pH was adjusted to 6.2 by addition of aqueous sodium bicarbonate solution with a mass fraction of solids of 10%. 207 g (2.18 mol) of ethylene urea (2-imidazolidinone hemihydrate, solid) were added and the resulting mixture was heated to a temperature of between 40° C. and 45° C. and held for three hours under stirring. At the end of three hours, 464 g (14.5 mol) of methanol were added. The pH was adjusted to about 2.5 with aqueous sulphuric acid (with a mass fraction of solute of 25%) and the reaction temperature was then raised and maintained at (48±3)° C. for three hours. At the end of three hours of methylation, 998 g (13.5 mol) of 1-butanol were added and pH was readjusted to about 2.5 with aqueous sulphuric acid as supra. The reaction temperature was again maintained at (48±3)° C. for one hour and then, excess methanol and butanol were removed slowly under reduced pressure (25.333 kPa slowly linearly decreased to 16 kPa, equivalent to 190 mm Hg ramped to 120 mm Hg) until a mass fraction of approximately from 36% to 40% of the total reaction mass had been removed. The remaining reaction mixture was then cooled to approximately 35° C. and the pH of the reaction mixture was then adjusted to approximately 6.5 with aqueous sodium hydroxide solution having a mass fraction of solids of 25%. The reaction temperature was then raised to (55±5)° C. and removal of excess methanol and butanol was continued under reduced pressure (16 kPa slowly linearly decreased to 6.7 kPa, equivalent to 120 mm Hg ramped to 50 mm Hg) until a dynamic viscosity of approximately 300 mPa·s and a mass fraction of solids of 63% were obtained. The resulting product solution was filtered.

The degree of etherification of the resulting straw yellow crosslinker solution (814 g) was determined by $^{13}$C-NMR analysis as n(—O-Alkyl)/n(EU)=1.92 mol/mol; "EU" stands for ethylene urea, its molar mass was determined by HPSEC as $M_w$=1553 g/mol, where $M_w$ stands for the weight average molar mass. The fraction of the area in the graph of refraction number difference versus elution volume commonly provided in a high performance size exclusion analysis, which is also referred to as gel permeation chromatography, of the low molar mass range, viz., below a molar mass of 1 kg/mol, was 34.1%. The Hazen Colour (determined in accordance with DIN-ISO 6271) was 383. The ratio of the amount of substance n(—O-Bu) of n-butoxy groups to the amount of substance n(—O-Me) of methoxy groups in the reaction products was 2.7 mol/mol.

TABLE 16

| Coating Composition | | |
|---|---|---|
| | Coating Composition | |
| | C16.1 | C16.2 |
| Crosslinker of | Example 16 | Comparative Example ("EU GO Resin") |
| Alkyd Resin | 52.5 g | 52.5 g |
| CLA Product | 18.8 g | 21.8 g |
| Ethanol | 9 g | 9 g |
| Methoxy Propanol | 0.9 g | 0.9 g |
| Catalyst 2 | 1.13 g | 1.13 g |
| Butyl Acetate | 17.7 g | 14.7 g |

TABLE 16.2

Coating Performance; coating composition of the table above applied by a wire wound coater # 65 on steel sheets having a white basecoat (WBC-B-1000), and cured at 65° C. for fifteen minutes:

|  | Coating Composition | |
|---|---|---|
|  | C 15.1 | C16.2 |
| Crosslinker of Example | 16 | "EU-GO Resin" |
| Hardness after 24 h (Koenig Pendulum) | 63 s | 98 s |
| Yellowness (CIELAB b) before heat treatment | −1.1 | −0.6 |
| Yellowness (CIELAB b) after heat treatment (two hours, 80° C.) | −1.0 | +0.1 |

The white basecoat panels were prepared as follows:

The white base coat coating composition was a blend of 810 g of a solvent borne hydroxy functional acrylic resin supplied at 65% mass fraction of solids in a mixture of xylene and n-butanol, having an approximate Tg of 18° C., a weight-average molar mass of 37,000 g/mol and a hydroxyl number of 80 mg/g, and an acid number of 12.5 mg/g, and of 190 g of methylated high imino melamine formaldehyde resin (MHIMF resin, see supra) with $TiO_2$ ground into the acrylic at a pigment to resin loading (mass ratio) of 1.16. The white base coat was formulated to be 65.9% total solids and 30.5% Total Resin Solids (TRS). The $TiO_2$ was ground into the acrylic in the presence of mass ratios of 10% n-butanol on TRS, 2% of methoxy propanol on TRS and 47% of butylacetate on TRS, with the help of a mass fraction of 2.0% nonionic polymeric pigment dispersant on TRS. The formulation was applied onto B-1000 CRS (cold rolled steel) using a #35 wire-wound coating bar. The applied formulation was allowed to flash at ambient conditions for ten minutes and cured at 140° C. for ten minutes. The film thickness of the panels was 0.7 mils (0.7×25.4 µm=17.9 µm).

(4.2) Example 17

Preparation of a MHIMF and GO-EU Hybrid

A resin according to the invention was prepared by the following procedure:

100 g of the MHIMF resin described supra were charged to a 0.25 L reaction vessel under a nitrogen purge and 58 g (0.4 mol) of an aqueous solution of glyoxal (ethane dial, with a mass fraction of solute of 40%) were added. The pH was measured to be 6.85 and no further adjustment was required. The resulting mixture was heated to a temperature of between 40° C. and 45° C. and held for two hours under stirring. C-13 NMR analyses of this reaction product indicated that moieties derived from glyoxal were bound to the melamine ring.

70 g (with a calculated mass fraction of solute of about 65%) of above reaction product was charged to a reaction vessel under nitrogen purge. 9.5 g (0.1 mol) of ethylene urea hemihydrate (2-imidazolidinone, solid) and 10 g de-ionised water were added. The pH was measured to be 6.43 and no further adjustment was required. The resulting mixture was heated to a temperature of between 40° C. and 45° C. and held for two hours under stirring. At this point 77 g (2.4 mol) of methanol were added. The pH was adjusted to about 2.8 with aqueous sulphuric acid (with a mass fraction of solute of 25%) and the reaction temperature was then raised and maintained at (48±3)° C. for two hours. At the end of two hours 55 g (0.74 mol) of 1-butanol were added, the pH of the reaction mixture was adjusted to about 2.8 with aqueous sulphuric acid (with a mass fraction of solute of 25%) and the reaction temperature was then raised and maintained at (48±3)° C. for two hours. At the end of this period the pH was then adjusted to approximately 6.6 with aqueous sodium hydroxide solution (mass fraction of solids of 25%). The dilute product was filtered and excess water, methanol and butanol were removed slowly under reduced pressure until 48 g of a yellow crosslinker resin solution with a mass fraction of solids of 72% were obtained. Formation of a mixed methyl butyl ether hybrid product was confirmed by C-13 NMR analysis.

This mixed ether hybrid product when evaluated in ambient and heat cured surface coating applications resulted in coating films with good appearance, satisfactory resistance properties comparable to formulations using amino-formaldehyde resins as crosslinkers and superior formulation stability.

[5] Hybrids Based on the Co-Reacts with bisbutoxycarbonylamino triazine (5.1) Example 18

Preparation of Non-Etherified 2-Imidazolidinone-Ethanedial Resin in Water 46 g (0.33 mol) of an aqueous solution of glyoxal (ethane dial, with a mass fraction of solute of 40%) were charged to a 0.1 L reaction vessel under a nitrogen purge and the pH was adjusted with aqueous sodium bicarbonate solution (with a mass fraction of solids of 10%) to 6.2. 26.6 g (0.28 mol) of ethylene urea hemihydrate (2-imidazolidinone, solid) were added and the resulting mixture was heated to a temperature of between 40° C. and 45° C. and held for two hours under stirring. C-13 NMR analyses confirmed the formation of the non-etherified 2-Imidazolidinone-Ethanedial resin in water. This product was stored at a temperature between 15° C. and 20° C. until further use.

(5.2) Example 19

Reaction of EU-GO with BBCT

A resin according to the invention was prepared as follows:

10 g of product from example 18 was charged to a reaction vessel under nitrogen purge. The pH was adjusted with aqueous sodium bicarbonate solution (with a mass fraction of solids of 10%) to 6.4. 10 g (0.31 mol) methanol and 1.25 g (0.004 mol) bisbutoxycarbonylamino-monoamino-triazine are charged to the reaction vessel. The contents are mixed and held at ambient (23° C.) to 50° C. for a period of two to six hours. C-13 NMR recorded, thin layer chromatography provide evidence of incorporation of or chain modification by triazine.

This crosslinker product when evaluated in ambient and heat cured surface coating applications resulted in coating films with good appearance, satisfactory resistance properties comparable to formulations using amino-formaldehyde resins as crosslinkers and superior formulation stability.

Example 20

Reaction of glyoxal with bis(butoxycarbonylamino)-monoamino-triazine (BBCT)

A crosslinker resin was prepared as follows:

145.09 g of an aqueous solution of glyoxal with a mass fraction of solute of 40% were charged to a reaction vessel under a nitrogen purge and the pH was adjusted with aqueous sodium bicarbonate solution (with a mass fraction of solids of 10%) to 6.2. 65 g (2 mol) of bis-(butoxycarbonylamino) monoamino-triazine were added and the resulting mixture was heated to a temperature of between 40° C. and 45° C. and held for two hours under stirring. At the end of this period 444 g of butanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess butanol and water were removed slowly under reduced pressure (25.333 kPa slowly linearly decreased to 16 kPa, equivalent to 190 mm Hg ramped to 120 mm Hg) over a period of about 3.5 hours.

This crosslinker product when evaluated in ambient and heat cured surface coating applications resulted in coating films with good appearance, satisfactory resistance properties comparable to formulations using amino-formaldehyde resins as crosslinkers and superior formulation stability.

[6] Hybrids Based on the 'Physical Blends' of Various Core Molecules, Additives or MF or UF Resins.

(6.1) Example 21

Preparation of a Butyl Methyl Ether of 2-Imidazolidinone

A resin according to the invention was prepared by the following procedure:

280 g (1.93 mol) of an aqueous solution of glyoxal (ethane dial, with a mass fraction of solute of 40%) were charged to a reaction vessel under a nitrogen purge and the pH was adjusted with aqueous sodium bicarbonate solution (with a mass fraction of solids of 10%) to 6.2. 154 g (1.62 mol) of ethylene urea hemihydrate (2-imidazolidinone, solid) were added and the resulting mixture was heated to a temperature of between 40° C. and 45° C. and held for two hours under stirring. At the end of this period 415 g (12.94 mol) of methanol were added. The pH was adjusted to about 2.4 with aqueous sulphuric acid (with a mass fraction of solute of 25%) and the reaction temperature was then raised and maintained at (48±3)° C. for two hours. At the end of two hours of methylation the pH of the reaction mixture was then adjusted to approximately 6.6 with aqueous sodium hydroxide solution (mass fraction of solids of 25%). Excess methanol and water were removed slowly under reduced pressure (25.333 kPa slowly linearly decreased to 16 kPa, equivalent to 190 mm Hg ramped to 120 mm Hg) over a period of about 3.5 hours. At the end of this distillation, 275 g (3.70 mol) of 1-butanol were added and pH was readjusted to about 2.26 with aqueous sulphuric acid (as supra). The reaction temperature was again maintained at (48±3)° C. for 2.5 hours. At the end of two and one half hours of butylation the pH of the reaction mixture was then adjusted to approximately 6.5 with aqueous sodium hydroxide solution (as supra). Excess butanol, methanol and water were removed slowly under reduced pressure (25.333 kPa slowly linearly decreased to 16 kPa, equivalent to 190 mm Hg ramped to 120 mm Hg) over a period of about two hours. At the end of this distillation, 331 g (4.46 mol) of 1-butanol were added and pH was readjusted to about 1.8 with aqueous sulphuric acid (as supra). The reaction temperature was again maintained at (48±3)° C. for two hours. At the end of two hours of this second butylation the pH of the reaction mixture was then adjusted to approximately 6.5 with aqueous sodium hydroxide solution (as supra). The reaction temperature was then raised (55±5)° C. for the removal of excess butanol, methanol and water under reduced pressure (16 kPa slowly linearly decreased to 6.7 kPa, equivalent to 120 mm Hg ramped to 50 mm Hg) until a mass fraction of solids of 65.3% were obtained.

The degree of alkylation and molar mass of the resulting yellow crosslinker solution (479 g) were determined by C-13 NMR (n(—O-Alkyl)/n(EU)=1.74 mol/mol; "EU" stands for ethylene urea, and by HPSEC ($M_w$=2898 g/mol, $M_w$ stands for the weight average molar mass) analyses. The ratio of the amount of substance of n-butoxy groups to the amount of substance of methoxy groups in the reaction products was 2.48 mol/1.0 mol.

Example 22

Addition of Urea 40 g of product from example 21 were charged to a reaction vessel under nitrogen purge. 0.26 g (0.04 mol) of urea solid was charged along with 0.5 g of de-ionized water. The resulting mixture was heated to a temperature of between 40° C. and 45° C. and held for two hours under stirring until all urea had dissolved. C-13 NMR analyses confirmed the incorporation of urea into the crosslinker. The degree of alkylation of the resulting yellow crosslinker solution (40 g) were determined by C-13 NMR analysis as n(—O-Alkyl)/n(EU)=1.67 mol/mol; "EU" stands for ethylene urea. The ratio of the amount of substance of n-butoxy groups to the amount of substance of methoxy groups in the reaction products was 4.06 mol/1.0 mol.

(6.4) Example 23

Addition of Butyl Carbamate 40 g of product from example 21 were charged to a reaction vessel under nitrogen purge. 2.6 g (0.02 mol) butyl carbamate solid was charged along with 0.5 g of de-ionized water. The resulting mixture was heated to a temperature of between 25° C. and 40° C. and held for two hours under stirring until all butyl carbamate had dissolved. C-13 NMR analyses confirmed the incorporation of butyl carbamate into the crosslinker. The degree of alkylation and molar mass of the resulting yellow crosslinker solution (40 g) were determined by C-13 NMR (n(—O-Alkyl)/n(EU)=1.04 mol/mol; "EU" stands for ethylene urea, and by HPSEC ($M_w$=3300 g/mol, $M_w$ stands for the weight average molar mass) analyses. The following data were found for curing behaviour:

TABLE 23

Coating Compositions and Curing (Hardness and Yellowness measure after Cure at 65° C. for 15 minutes)

| | Coating composition | |
|---|---|---|
| | C23 | C21 (comparative) |
| Alkyd resin | 52.5 g | 52.5 g |
| Crosslinker of Example | 23; 20.8 g | 21; 21.8 g |
| Methoxypropanol | 0.9 g | 0.9 g |
| Catalyst 2 | 1.13 g | 1.13 g |
| Ethanol | 9.0 g | 9.0 g |
| Butyl Acetate | 15.7 g | 14.7 g |
| Konig Hardness | 93 s | 98 s |
| Yellowness (CIELAB b) | −0.3 | −0.6 |

At slightly lower hardness, there is a lower propensity to yellow on baking vis-à-vis the comparison.

(6.5) Example 24

Addition of Trimethylmelamine 40 g of product from example 21 were charged to a reaction vessel under nitrogen purge. 0.27 g (0.002 mol) trimethyl melamine solid was charged along with 0.5 g of de-ionized water. The resulting mixture was heated to a temperature of between 25° C. and 40° C. and held for two hours under stirring until all trimethyl melamine had dissolved. C-13 NMR analyses confirmed the incorporation of trimethyl melamine into the crosslinker.

TABLE 24.1

Coating Compositions (mass of components in g)

| | Coating Composition | | | |
|---|---|---|---|---|
| | C16 | C22 | C23 | C24 |
| Crosslinker of | Example 16 | Example 22 | Example 23 | Example 24 |
| Alkyd resin | 52.5 | 52.5 | 52.5 | 52.5 |
| CLA Product | 18.8 | 20.8 | 20.8 | 20.8 |
| Methoxy Propanol | 0.9 | 0.9 | 0.9 | 0.9 |
| Catalyst 2 | 1.1 | 1.1 | 1.1 | 1.1 |
| Butyl Acetate | 17.7 | 15.7 | 15.7 | 15.7 |
| Ethanol | 9.0 | 9.0 | 9.0 | 9.0 |

TABLE 24.2

Coating Performance
(coating compositions applied to steel panels with white basecoat as described in Example 16, using a wire-wound coating bar # 65 and cured at 65° C. for 15 minutes

| | Coating Composition | | | |
|---|---|---|---|---|
| | C16 | C22 | C23 | C24 |
| Crosslinker of Example | 16 | 22 | 23 | 24 |
| Film appearance | good | good | good | good |
| Konig Hardness after 24 h | 63 | 127 | 93 | 126 |
| 1 hour print | NM | 0-1 | NM | 1-2 |

1 h print values of C22 and C 24 are excellent/good.

The invention claimed is:

1. A product H that can be used as crosslinking agent comprising a mixture of reaction products P of cyclic alkyleneureas U and multifunctional aldehydes A2 with further reaction products having as constituents, besides U and A2, also at least one of aminoplast formers M which are different from the cyclic alkyleneureas U, and of monofunctional aldehydes A1, the mixture constituting product H comprising the reaction products P made by reacting cyclic alkylene ureas U and multifunctional aldehydes A2, and at least one of the following reaction products:
   a) reaction products UMA2 made by reaction of cyclic alkylene ureas U, aminoplast formers M which are different from the cyclic alkyleneureas U, and multifunctional aldehydes A2;
   b) reaction products UMA1A2 made by reaction of cyclic alkylene ureas U, aminoplast formers M which are different from the cyclic alkyleneureas U, monofunctional aldehydes A1, and multifunctional aldehydes A2;
   c) reaction products MA1A2 made by reaction of aminoplast formers M which are different from the cyclic alkyleneureas U, monofunctional aldehydes A1, and multifunctional aldehydes A2;
   d) reaction products UA1A2 made by reaction of cyclic alkylene ureas U, monofunctional aldehydes A1, and multifunctional aldehydes A2;
   e) reaction products MA2 made by reaction of aminoplast formers M which are different from the cyclic alkyleneureas U, and multifunctional aldehydes A2;
   f) reaction products UA1 made by reaction of cyclic alkylene ureas U, and monofunctional aldehydes A1;
   g) reaction products UMA1 made by reaction of cyclic alkylene ureas U, aminoplast formers M which are different from the cyclic alkyleneureas U, and monofunctional aldehydes A1; and
   h) reaction products MA1 made by reaction of aminoplast formers M which are different from the cyclic alkyleneureas U, and monofunctional aldehydes A1,
   wherein, in the case of reaction product h) being present in mixture with the reaction product P which is UA2, at least one of the other reaction products a), b), c), d), e), f), or g) is also present in the mixture, and
   wherein product H or reaction product P of U and A2, or both are optionally etherified by reaction of at least a part of hydroxyl groups formed by addition reaction of N—H groups and aldehyde groups, with one or more aliphatic alcohols R'—OH, and which alcohol R'—OH is, optionally, linear, branched or cyclic, and
   wherein glyoxal is present in the multifunctional aldehydes A2.

2. The product H of claim 1, wherein the at least one aminoplast former M is selected from the group consisting of amines, acid amides, urethanes R—O—CO—NH$_2$ and thiourethanes R—O—CS—NH$_2$, R—S—CO—NH$_2$ or R—S—CS—NH$_2$ where R is, optionally, in each case a linear or branched aliphatic, cycloaliphatic, aromatic or heterocyclic radical having up to twenty carbon atoms, cyclic amidines selected from the group consisting of melamine and its homologues, guanamines, and cyclic urea compounds that are not cyclic alkylene ureas U.

3. The product H of claim 2, wherein the acid amides are selected from the group consisting of
   linear, branched or cyclic amides of mono- or multifunctional carboxylic acids, including also amides of aromatic carboxylic acids,
   lactams having from four to fifteen carbon atoms,
   sulphonamides,
   sulphurylamides,
   cyanamide and its derivatives,
   dicyandiamide and its derivatives,
   urea, thiourea, guanidine, biuret, 2-imino-4-thiobiuret, and homologues and derivatives thereof.

4. The product H of claim 2, wherein the amidines are selected from the group consisting of melamine, benzoguanamine, acetoguanamine, formoguanamine, N-alkylmelamine, N, N'-dialkylmelamine, N, N', N''-trialkylmelamine, trialkoxymelamine, and alkoxycarbamoyltriazines in which at least one aminic hydrogen atoms of melamine is replaced by an alkoxycarbamoyl group, wherein each alkyl and alkoxy group, optionally has, independent from others in the same molecule, from one to ten carbon atoms in the alkoxy group.

5. The product H of claim 1, wherein the multifunctional aldehydes A2 has the formula OHC—R''—CHO where R'' is a direct bond or a divalent radical.

6. The product H of claim 1, wherein the monofunctional aldehydes A1 are linear branched or cyclic aliphatic aldehydes having from one to twenty carbon atoms.

7. The product H of claim 1, wherein the cyclic alkylene ureas U have at least one unsubstituted amidic >NH group and are cycloaliphatic or bicycloaliphatic compounds having an element of the structure —NH—CO—NH— within an aliphatic ring structure.

8. A process to make the product H of claim 1, comprising the following steps:
 a) charging at least one cyclic alkyleneurea U, optionally in mixture with at least one aminoplast former M that is not the same as the cyclic alkyleneurea U,
 b) admixing at least one multifunctional aldehyde A2, optionally in mixture with at least one monofunctional aldehyde A1, to the mixture of step a) to effect an addition reaction to form a reaction product P of U and A2, optionally, in the presence of a solvent which does not react with any of the at least one multifunctional aldehyde A2, the at least one monofunctional aldehyde A1, the at least one cyclic alkyleneurea U, the at least one aminoplast former M, and the reaction product P,
 c) optionally, removing water, during or after step b),
 d) optionally, adding an alcohol $R^1$—OH, and etherifying under acid conditions, and optionally, removing at least one of water and unreacted alcohol $R^1$—OH, and
 e) further optionally, adding after step d) a further quantity of an alcohol $R^2$—OH and etherifying under acid conditions, and optionally, removing at least one of water and unreacted alcohol $R^2$—OH,
 wherein, if step e) is done, it is done once or more than once, and
 where $R^1$ is selected from the group consisting of linear, branched and cyclic alkyl groups, and optionally at least one olefinic unsaturation, and $R^2$ is selected from the group consisting of linear, branched and cyclic alkyl groups, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one.

9. A process to make the product H of claim 1, comprising the following steps:
 a) admixing at least one multifunctional aldehyde A2, optionally in mixture with at least one monofunctional aldehyde A1, to at least one cyclic alkyleneurea U to effect an addition reaction to form a reaction product UA, wherein the quantities of A2, U and, if present, A1 are chosen such that there is an excess of the amount of substance of aldehyde groups over the amount of substance of NH groups in the at least one cyclic alkylene urea U, and optionally, removing water,
 b) admixing at least one aminoplast former M that is not the same as the cyclic alkyleneurea U and continuing the addition reaction,
 c) optionally, removing water, during or after step a) and/or during or after step b),
 where steps a) and b) are optionally conducted in the presence of a solvent which does not react with any of the multifunctional aldehyde A2, the monofunctional aldehyde A1, the cyclic alkyleneurea U, the at least one aminoplast former M, the reaction product UA, and the reaction product P of U and A2,
 d) optionally, adding an alcohol $R^1$—OH, and etherifying under acid conditions, and optionally, removing at least one of water and unreacted alcohol $R^1$—OH, and
 e) further optionally, adding after step d) a further quantity of an alcohol $R^2$—OH and etherifying under acid conditions, optionally, removing at least one of water and unreacted alcohol $R^2$—OH,
 wherein, if step e) is done, it is done once or more than once, and
 where $R^1$ is selected from the group consisting of linear, branched and cyclic alkyl groups, and optionally at least one olefinic unsaturation, and $R^2$ is selected from the group consisting of linear, branched and cyclic alkyl groups, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one.

10. A process to make the product H of claim 1, comprising the following steps:
 a) admixing at least one multifunctional aldehyde A2, optionally in mixture with at least one monofunctional aldehyde A1, to at least one aminoplast former M that is not the same as the at least one cyclic alkyleneurea U of step b) to effect an addition reaction under formation of a reaction product MA, wherein the quantities of the at least one multifunctional aldehyde A2 and M, and optionally, the at least one monofunctional aldehyde A1, are chosen such that there is an excess of the amount of substance of aldehyde groups over the amount of substance of NH groups in the at least one aminoplast former M, and optionally, removing water during or after this step a),
 b) admixing at least one cyclic alkyleneurea U and continuing the addition reaction,
 c) optionally, removing water, during or after step b),
 where steps a) and b) are optionally conducted in the presence of a solvent which does not react with any of the multifunctional aldehyde A2, the monofunctional aldehyde A1, the cyclic alkyleneurea U, the at least one aminoplast former M, the reaction product MA, and the reaction product P of U and A2,
 d) optionally, adding an alcohol $R^1$—OH, and etherifying under acid conditions, and optionally, removing at least one of water and unreacted alcohol $R^1$—OH, and
 e) further optionally, adding after step d) a further quantity of an alcohol $R^2$—OH and etherifying under acid conditions, and optionally, removing at least one of water and unreacted alcohol $R^2$—OH,
 wherein, if step e) is done, it is done once or more than once, and
 where $R^1$ is selected from the group consisting of linear, branched and cyclic alkyl groups, and optionally at least one olefinic unsaturation, and $R^2$ is selected from the group consisting of linear, branched and cyclic alkyl groups, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one.

11. A process to make the product H of claim 1, comprising the following steps:
   a) charging at least one cyclic alkyleneurea U,
   b) admixing at least one multifunctional aldehyde A2, optionally in mixture with at least one monofunctional aldehyde A1, to effect an addition reaction to form a reaction product UA,
   c) optionally, removing water, during or after step b), to form an at least partially dehydrated reaction product UA,
   d) adding to the reaction product UA of steps b) or c) a preformed addition product MA of an aminoplast former M and a monofunctional aldehyde A1, or of a preformed addition product MA of an aminoplast former M and a mixture of a monofunctional aldehyde A1 and a multifunctional aldehyde A2, or a mixture of an aminoplast former M and at least one of a monofunctional aldehyde A1, and/or at least one multifunctional aldehyde A2, and reacting the mixture thus formed to effect formation of a product H under at least a partial interchange of the components of the reaction product UA, optionally under removal of water,
   e) optionally, adding an alcohol $R^1$—OH, and etherifying under acid conditions, and optionally, removing at least one of water and unreacted alcohol $R^1$—OH, and
   f) further optionally, adding after step e) a further quantity of an alcohol $R^2$—OH and etherifying under acid conditions, optionally, removing at least one of water and unreacted alcohol $R^2$—OH,
   wherein, if step f) is done, it is done once or more than once,
   wherein optionally, any of the steps b) to f) are conducted in the presence of a solvent which does not react with any of the multifunctional aldehyde A2, the at least one monofunctional aldehyde A1, the at least one cyclic alkyleneurea U, the at least one aminoplast former M, the addition product MA of an aminoplast former M and a mixture of a monofunctional aldehyde A1 and a multifunctional aldehyde A2, and the reaction products UA, MA, and P, and
   where $R^1$ is selected from the group consisting of linear, branched and cyclic alkyl groups, and optionally at least one olefinic unsaturation, and $R^2$ is selected from the group consisting of linear, branched and cyclic alkyl groups, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one.

12. A process to make the product H of claim 1, comprising the following steps:
   a) charging at least one aminoplast former M,
   b) admixing at least one monofunctional aldehyde A1, optionally in mixture with at least one multifunctional aldehyde A2, to effect an addition reaction to form a reaction product MA, optionally, in the presence of a solvent which does not react with any of the at least one multifunctional aldehyde A2, the at least one monofunctional aldehyde A1, the at least one aminoplast former M, and the reaction product MA,
   c) optionally, removing water, during or after step b), to form an at least partially dehydrated reaction product MA,
   d) adding to the reaction product MA of steps b) or c) a preformed addition product UA of a cyclic alkylene urea U and a multifunctional aldehyde A2, or a preformed addition product UA of at least one cyclic alkylene urea U and a mixture of a monofunctional aldehyde A1 and a multifunctional aldehyde A2, or a mixture of a cyclic alkylene urea U and at least one of a monofunctional aldehyde A1, and/or a multifunctional aldehyde A2, and reacting the mixture thus formed to effect formation of a reaction product P under at least a partial interchange of the components of the addition products MA and UA, optionally under removal of water, and further optionally, in the presence of a solvent which does not react with any of the at least one multifunctional aldehyde A2, the at least one monofunctional aldehyde A1, the at least one cyclic alkyleneurea U, the at least one aminoplast former M, and the reaction products UA, MA, and P,
   e) optionally, adding an alcohol $R^1$—OH, and etherifying under acid conditions, and optionally, removing at least one of water and unreacted alcohol $R^1$—OH, and
   f) further optionally, adding after step e) a further quantity of an alcohol $R^2$—OH and etherifying under acid conditions, optionally, removing at least one of water and unreacted alcohol $R^2$—OH,
   wherein, if step f) is done, it is done once or more than once, and
   where $R^1$ is selected from the group consisting of linear, branched and cyclic alkyl groups, and optionally at least one olefinic unsaturation, and $R^2$ is selected from the group consisting of linear, branched and cyclic alkyl groups, and optionally at least one olefinic unsaturation, and further optionally, at least one further hydroxyl group, wherein no two hydroxyl groups may be on the same carbon atom, and if $R^1$ is different from $R^2$, the number of carbon atoms of $R^1$ is smaller than the number of carbon atoms of $R^2$ by at least one.

13. A process to make the product H of claim 1, comprising the following steps:
   a) mixing
      at least one adduct UA made by reaction of at least one cyclic alkyleneurea U, and at least one aldehyde selected from the group consisting of multifunctional aldehydes A2 and monofunctional aldehydes A1, which the adduct UA is optionally etherified by reaction of at least a part of the hydroxyl groups formed by addition reaction of N—H groups and aldehyde groups, with one or more aliphatic alcohols R'—OH, and which alcohol R'—OH is, optionally, linear, branched or cyclic, with
      at least one adduct MA made by reaction of at least one at least one aminoplast former M that is not the same as the cyclic alkyleneurea U, and at least one aldehyde selected from the group consisting of multifunctional aldehydes A2 and monofunctional aldehydes A1, which the adduct MA is optionally etherified by reaction of at least a part of the hydroxyl groups formed by addition reaction of N—H groups and aldehyde groups, with one or more aliphatic alcohols R'OH, and which alcohol R'OH is, optionally, linear, branched or cyclic,
   b) reacting the mixture of UA and MA prepared in step a), optionally in the presence of a catalyst, to at least partial interchange chemical bonds formed between moieties derived from the aldehydes A1 and/or A2 with the cyclic alkylene ureas U and the aminoplast formers M, and c) optionally, etherifying the product formed in step b) by reaction of at least a part of the hydroxyl groups formed by addition reaction of N—H groups and aldehyde groups, with one or more aliphatic alcohols R'—OH, and which alcohol R'—OH is, optionally, linear, branched or cyclic, where any of steps a), b) and c) is optionally conducted in the presence of a solvent which does not react with any of the multifunctional aldehyde A2, the monofunctional aldehyde A1, the adduct UA, the adduct MA, and the product formed in step b).

14. The process of claim 8 wherein the addition of the at least one multifunctional aldehyde A2 is made in at least two separate portions at a different time during the process.

15. A method of forming a coating composition comprising admixing the product H of claim 1 to a crosslinkable resin, and optionally, adding a catalyst, wherein the crosslinkable resin is an oligomeric or polymeric material having at least one kind of functional groups selected from the group consisting of hydroxy functional groups, acid functional groups, amide functional groups, amino functional groups, imino functional groups, mercaptan functional groups, phosphine functional groups, and carbamate functional groups, to form a coating composition.

16. The method of claim 15, wherein the oligomeric or polymeric material is a solvent-borne material.

17. The method of use of claim 15, wherein the oligomeric or polymeric material is a water-borne material.

18. The method of claim 15 further comprising applying the coating composition formed to a substrate selected from the group consisting of metal, semiconductor surfaces, plastics including composite, thermoplastic and thermoset materials, glass, ceramic, stone, concrete, plaster, wood, fabricated wood, paper, cardboard, leather, and textiles.

19. The method of claim 18, wherein least one of additives, diluents, fillers, pigments, and colourants, are admixed to the coating composition before application to a substrate.

20. The product H of claim 1, wherein R'—OH has from one to ten carbon atoms.

21. The product H of claim 3, wherein the lactams are selected from the group consisting of γ-butyrolactam, δ-valerolactam, ε-caprolactam, and ω-laurinlactam.

22. The product H of claim 5,
wherein R" is a linear, branched or cyclic aliphatic divalent radical and has from one to forty carbon atoms, or R" is an aliphatic divalent radical that is linear, branched or cyclic and has from one to thirty-nine carbon atoms, which radical carries at least one additional aldehyde group —CHO, and
wherein the multifunctional aldehydes A2 are selected from the group consisting of glyoxal, malonaldehyde, succinaldehyde, glutaraldehyde, adipaldehyde, 2-methoxymethyl-2,4-dimethylpentane-1,5-dial, cyclohexane-1,3-dial, cyclohexane-1,4-dial, and dialdehydes derived from dimer fatty acids.

23. The product H of claim 6, wherein the monofunctional aldehydes A1 are selected from the group consisting of formaldehyde, acetaldehyde, propionaldehyde, n-butyraldehyde, 2-methylpropionaldehyde, valeraldehyde (1-pentanal), capronaldehyde (1-hexanal), enanthal (1-heptanal), caprylaldehyde (1-octanal), and 2-ethyl-1-hexanal.

24. The product H of claim 7,
wherein the total number of ring atoms in the aliphatic ring structure is from 5 to 7,
wherein the cyclic alkylene ureas U are selected from the group consisting of ethylene urea or imidazolidin-2-one, 1,2-propylene urea or 4-methylimidazolidin-2-one, 1,3-propylene urea or 2-ketohexahydropyrimidine or tetrahydro-(1H)-pyridiminone, and 1,4-butylene urea or tetramethylene urea, wherein the alkylene group is substituted on one or more carbon atoms by hydroxyl groups, or by alkyl groups, or alkoxy groups, and
wherein each of the alkyl groups or the alkoxy groups independently from each other have from one to ten carbon atoms.

25. The process to make a product H of claim 8, wherein $R^1$ is selected from the group consisting of linear, branched and cyclic alkyl groups having from one to ten carbon atoms, and wherein $R^2$ is selected from the group consisting of linear, branched and cyclic alkyl groups having from one to ten carbon atoms.

26. The process to make a product H of claim 9, wherein $R^1$ is selected from the group consisting of linear, branched and cyclic alkyl groups having from one to ten carbon atoms, and wherein $R^2$ is selected from the group consisting of linear, branched and cyclic alkyl groups having from one to ten carbon atoms.

27. The process to make a product H of claim 10, wherein $R^1$ is selected from the group consisting of linear, branched and cyclic alkyl groups having from one to ten carbon atoms, and wherein $R^2$ is selected from the group consisting of linear, branched and cyclic alkyl groups having from one to ten carbon atoms.

28. The process to make a product H of claim 11, wherein $R^1$ is selected from the group consisting of linear, branched and cyclic alkyl groups having from one to ten carbon atoms, and wherein $R^2$ is selected from the group consisting of linear, branched and cyclic alkyl groups having from one to ten carbon atoms.

29. The process to make a product H of claim 12, wherein $R^1$ is selected from the group consisting of linear, branched and cyclic alkyl groups having from one to ten carbon atoms, and wherein $R^2$ is selected from the group consisting of linear, branched and cyclic alkyl groups having from one to ten carbon atoms.

30. The process to make a product H of claim 13, wherein the one or more aliphatic alcohols R'—OH have from one to ten carbon atoms, and wherein the catalyst is selected from the group consisting of acid catalysts and basic catalysts.

31. The method of claim 15, wherein the catalyst is an acid catalyst.

* * * * *